(12) United States Patent
Furihata et al.

(10) Patent No.: US 9,691,339 B2
(45) Date of Patent: Jun. 27, 2017

(54) DISPLAY APPARATUS AND DISPLAY APPARATUS CONTROL CIRCUIT

(75) Inventors: Hirobumi Furihata, Kanagawa (JP); Takashi Nose, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 196 days.

(21) Appl. No.: 14/007,228

(22) PCT Filed: Feb. 20, 2012

(86) PCT No.: PCT/JP2012/053942
§ 371 (c)(1),
(2), (4) Date: Sep. 24, 2013

(87) PCT Pub. No.: WO2012/132624
PCT Pub. Date: Oct. 4, 2012

(65) Prior Publication Data
US 2014/0022221 A1 Jan. 23, 2014

(30) Foreign Application Priority Data
Mar. 29, 2011 (JP) .................................. 2011-073478

(51) Int. Cl.
*G09G 3/36* (2006.01)
*G09G 3/00* (2006.01)
(Continued)

(52) U.S. Cl.
CPC ........... *G09G 3/3611* (2013.01); *G09G 3/003* (2013.01); *H04N 5/66* (2013.01); *H04N 19/136* (2014.11);
(Continued)

(58) Field of Classification Search
CPC .. G09G 2370/08; G09G 3/003; G09G 3/3611; H04N 19/115; H04N 19/136; H04N 5/66
(Continued)

(56) References Cited

U.S. PATENT DOCUMENTS 5,388,209 A * 2/1995 Akagiri ............. G11B 11/10502
  704/201
6,208,689 B1 * 3/2001 Ohira ................... H04N 19/159
  375/240.03
(Continued)

FOREIGN PATENT DOCUMENTS

JP 2007-067531 A 3/2007
JP 2007-306545 A 11/2007
(Continued)

OTHER PUBLICATIONS

Communication dated Jun. 18, 2014, from the Japanese Patent Office in counterpart Japanese Patent Application No. 2013507255.
(Continued)

*Primary Examiner* — Tony Davis
(74) *Attorney, Agent, or Firm* — Sughrue Mion, PLLC

(57) ABSTRACT

A display apparatus includes: a display device; a display device driver which drives the display device; a compression section adapted to an operation of generating compression data by compression processing performed on image data; and a transmission section which, when receiving compressed data from the compression section, transmits the compressed data to the display device driver by using a serial data signal. The compression section performs the compression processing with a data compression ratio selected in response to a frame rate with which the display device driver drives the display device. The display device driver receives the serial data signal from the transmission section, generates decompressed data by decompressing the compressed data transmitted by the serial data signal, and drives the display device in response to the decompressed data. The data compression ratio used in the compression processing is set so that the transmission rate of the serial data signal from the transmission section to the display
(Continued)

device driver is kept constant independently of the frame rate.

9 Claims, 26 Drawing Sheets

(51) Int. Cl.
*H04N 5/66* (2006.01)
*H04N 19/136* (2014.01)
*H04N 19/115* (2014.01)

(52) U.S. Cl.
CPC ....... *G09G 2370/08* (2013.01); *H04N 19/115* (2014.11)

(58) Field of Classification Search
USPC .......... 375/240; 348/207.1, 240.25; 382/282; 345/204
See application file for complete search history.

(56) References Cited

U.S. PATENT DOCUMENTS

| | | | | |
|---|---|---|---|---|
| 6,229,852 | B1* | 5/2001 | Hoang | H04N 19/61 375/240.14 |
| 6,614,483 | B1* | 9/2003 | Lee | G06T 9/00 348/391.1 |
| 6,989,773 | B2* | 1/2006 | Wee | H04N 21/234 341/51 |
| 7,333,929 | B1* | 2/2008 | Chmounk | G10L 19/24 704/200 |
| 8,705,635 | B2* | 4/2014 | Lee | G06T 9/00 375/240.23 |
| 2002/0064314 | A1* | 5/2002 | Comaniciu et al. | 382/239 |
| 2002/0080881 | A1* | 6/2002 | Honda | H04N 19/172 375/240.16 |
| 2002/0094031 | A1* | 7/2002 | Ngai | H04N 21/23655 375/240.27 |
| 2003/0038883 | A1* | 2/2003 | Takahashi | H04N 5/232 348/207.1 |
| 2004/0196903 | A1* | 10/2004 | Kottke | H04N 19/147 375/240.03 |
| 2005/0190872 | A1* | 9/2005 | Seong et al. | 375/354 |
| 2005/0232597 | A1* | 10/2005 | Shimazaki | H04N 5/772 386/240 |
| 2005/0243190 | A1* | 11/2005 | Ogikubo | G11B 27/005 348/231.99 |
| 2006/0018553 | A1* | 1/2006 | Lee | H04N 19/172 382/232 |
| 2007/0046620 | A1 | 3/2007 | Ugajin | |
| 2008/0279275 | A1* | 11/2008 | Suzuki | H04N 19/176 375/240.03 |
| 2009/0097764 | A1* | 4/2009 | Sung | H04N 19/172 382/239 |
| 2009/0102807 | A1 | 4/2009 | Kashiwa et al. | |
| 2009/0116563 | A1* | 5/2009 | Kawamura | H04N 7/152 375/240.26 |
| 2009/0245760 | A1* | 10/2009 | Kawano | H04N 9/7921 386/241 |
| 2009/0322713 | A1 | 12/2009 | Furihata et al. | |
| 2010/0046607 | A1* | 2/2010 | Tseng | H04N 19/172 375/240.01 |
| 2010/0110285 | A1* | 5/2010 | Nobori | 348/384.1 |
| 2010/0231736 | A1* | 9/2010 | Hosokawa | H04N 5/2351 348/222.1 |
| 2010/0253853 | A1 | 10/2010 | Sakashita | |
| 2011/0150330 | A1* | 6/2011 | Jannard | H04N 19/30 382/166 |
| 2011/0176054 | A1* | 7/2011 | Omae | H04N 7/147 348/384.1 |
| 2011/0267452 | A1* | 11/2011 | Notsu | G06K 9/00798 348/116 |
| 2012/0044375 | A1* | 2/2012 | Lin | H04N 19/146 348/222.1 |
| 2012/0086818 | A1* | 4/2012 | Yamamoto | H04N 5/23293 348/207.1 |
| 2015/0078431 | A1* | 3/2015 | Sung | H04N 19/172 375/240.02 |

FOREIGN PATENT DOCUMENTS

| | | |
|---|---|---|
| JP | 2008-039890 A | 2/2008 |
| JP | 2009-098504 A | 5/2009 |
| JP | 2010-096951 A | 4/2010 |
| JP | 2010113012 A | 5/2010 |
| JP | 2010-141775 A | 6/2010 |
| JP | 4507265 B2 | 7/2010 |
| JP | 2010-243608 A | 10/2010 |

OTHER PUBLICATIONS

International Preliminary Report on Patentability issued Oct. 2, 2013 in PCT/JP2012/053942.
Communication dated May 20, 2015 from the State Intellectual Property Office of the P.R.C. in counterpart application No. 201280016020.7.

* cited by examiner

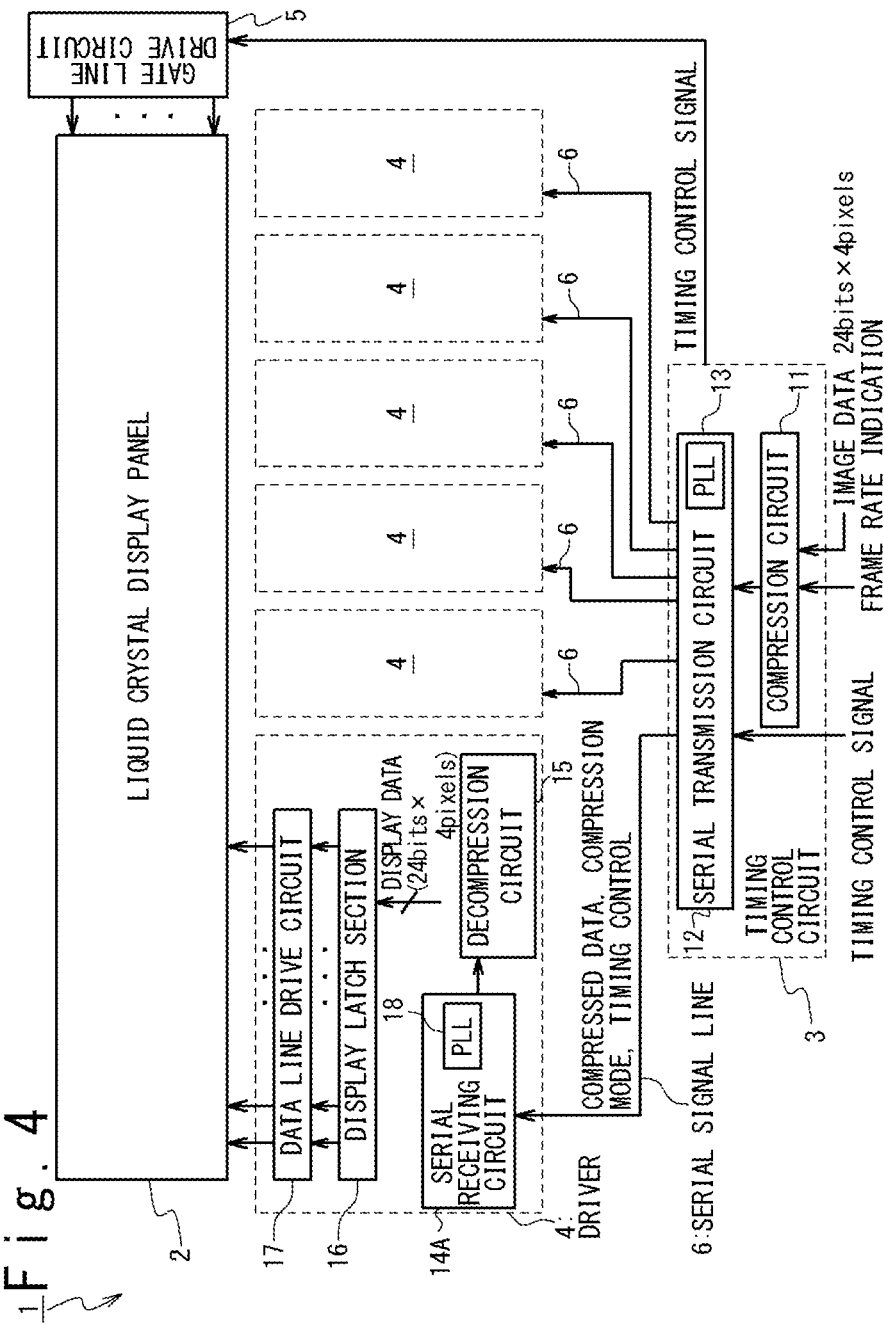

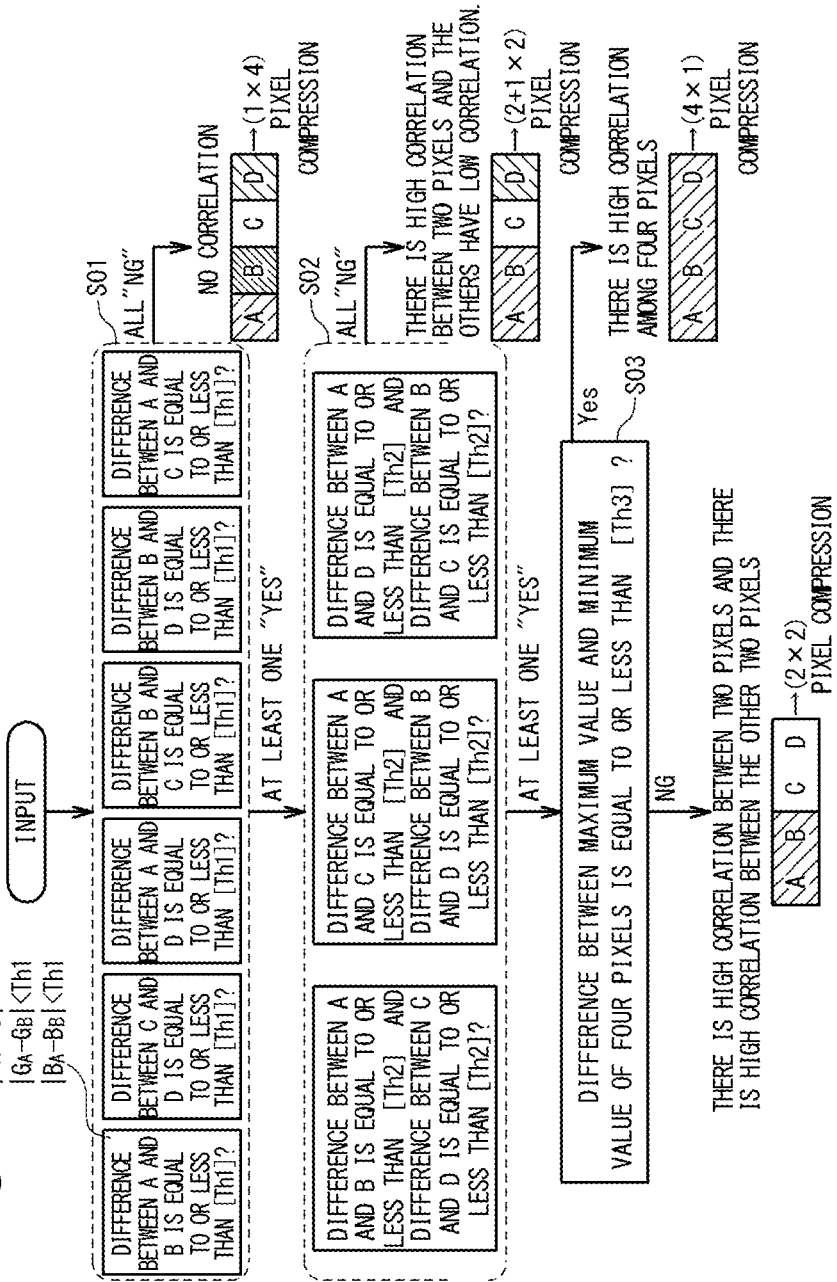

Fig. 9A

| COMPRESSION TYPE RECOGNITION BIT (1bit) | R<sub>A</sub>DATA (4bits) | G<sub>A</sub>DATA (4bits) | B<sub>A</sub>DATA (4bits) | R<sub>B</sub>DATA (4bits) | G<sub>B</sub>DATA (4bits) | B<sub>B</sub>DATA (4bits) |

| R<sub>C</sub>DATA (4bits) | G<sub>C</sub>DATA (4bits) | B<sub>C</sub>DATA (4bits) | R<sub>D</sub>DATA (4bits) | G<sub>D</sub>DATA (4bits) | B<sub>D</sub>DATA (3 bits) |

TOTAL 48 BITS
(DATA COMPRESSION RATIO 50%)

Fig. 9B

| COMPRESSION TYPE RECOGNITION BIT (1bit) | R$_A$DATA (5bits) | G$_A$DATA (6bits) | B$_A$DATA (5bits) | R$_B$DATA (5bits) | G$_B$DATA (6bits) | B$_B$DATA (5bits) |

| R$_C$DATA (5bits) | G$_C$DATA (6bits) | B$_C$DATA (5bits) | R$_D$DATA (5bits) | G$_D$DATA (6bits) | B$_D$DATA (5bits) |

TOTAL 64 BITS
(DATA COMPRESSION RATIO 66.7%)

Fig. 10A

(1×4)PIXEL COMPRESSION

⟨ORIGINAL IMAGE DATA⟩

|   | R | G | B | α |
|---|---|---|---|---|
| A | 50 | 1 | 30 | 0 |
| B | 51 | 100 | 39 | 5 |
| C | 4 | 4 | 100 | 10 |
| D | 100 | 1 | 2 | 15 |

ADD α →

|   | R | G | B |
|---|---|---|---|
| A | 50 | 1 | 30 |
| B | 56 | 105 | 44 |
| C | 14 | 14 | 110 |
| D | 115 | 16 | 17 |

ROUNDING →

⟨COMPRESSED DATA⟩

|   | R | G | B |
|---|---|---|---|
| A | 3 | 0 | 2 |
| B | 4 | 7 | 3 |
| C | 1 | 1 | 7 |
| D | 7 | 1 | 1 |

ROUNDING: TRUNCATE LOWER 5 BITS AFTER ADDING 16 FOR B SUBPIXEL OF PIXEL D
TRUNCATE LOWER 4 BITS AFTER ADDING 8 FOR OTHER SUBPIXELS

Fig. 10B (1×4) PIXEL DECOMPRESSION

⟨COMPRESSED DATA⟩

|   | R | G | B |
|---|---|---|---|
| A | 3 | 0 | 2 |
| B | 4 | 7 | 3 |
| C | 1 | 1 | 7 |
| D | 7 | 1 | 1 |

LEFT BIT SHIFT →

|   | R | G | B |
|---|---|---|---|
| A | 48 | 0 | 32 |
| B | 64 | 112 | 48 |
| C | 16 | 16 | 112 |
| D | 112 | 16 | 32 |

SUBTRACT α →

⟨DECOMPRESSED DATA⟩

|   | R | G | B |
|---|---|---|---|
| A | 48 | 0 | 32 |
| B | 59 | 107 | 43 |
| C | 6 | 6 | 102 |
| D | 97 | 1 | 17 |

(8bits/subpixel)

LEFT BIT SHIFT: 5-BIT LEFT SHIFT FOR B SUBPIXEL OF PIXEL D
4-BIT LEFT SHIFT FOR OTHER SUBPIXELS

Fig. 11A

| COMPRESSION TYPE RECOGNITION BIT (2bits) | FORM RECOGNITION DATA (3bits) | R REPRESENTATIVE VALUE (5or6bits) | G REPRESENTATIVE VALUE (5or6bits) | B REPRESENTATIVE VALUE (5bits) | LARGE-SMALL RECOGNITION DATA (1bit ×0~2) | β COMPARISON RESULT DATA (1bit ×2) |
|---|---|---|---|---|---|---|

DATA FOR TWO PIXELS WITH HIGH CORRELATION

| Ri DATA (4bits) | Gi DATA (4bits) | Bi DATA (4bits) | Rj DATA (4bits) | Gj DATA (4bits) | Bj DATA (4bits) |
|---|---|---|---|---|---|

DATA FOR TWO PIXELS WITH LOW CORRELATION

TOTAL 48 BITS
(DATA COMPRESSION RATIO 50%)

Fig. 11B

| COMPRESSION TYPE RECOGNITION BIT (2bits) | FORM RECOGNITION DATA (3bits) | R REPRESENTATIVE VALUE (7or8bits) | G REPRESENTATIVE VALUE (7or8bits) | B REPRESENTATIVE VALUE (7or8bits) | LARGE-SMALL RECOGNITION DATA (1bit x0~3) | β COMPARISON RESULT DATA (1bit x 3) |
|---|---|---|---|---|---|---|

DATA FOR TWO PIXELS WITH HIGH CORRELATION

| RiDATA (5bits) | GiDATA (6bits) | BiDATA (5bits) | RjDATA (5bits) | GjDATA (6bits) | BjDATA (5bits) |
|---|---|---|---|---|---|

DATA FOR TWO PIXELS WITH LOW CORRELATION

TOTAL 64 BITS
(DATA COMPRESSION RATIO 66.70%)

Fig. 12A (2+1×2) PIXEL COMPRESSION

⟨ORIGINAL IMAGE DATA⟩

|   | R | G | B |
|---|---|---|---|
| A | 50 | 2 | 30 |
| B | 59 | 1 | 39 |
| C | 4 | 4 | 100 |
| D | 100 | 1 | 2 |

PIXELS A AND B: HIGH CORRELATION

|   | R | G | B |
|---|---|---|---|
| A | 50 | 2 | 30 |
| B | 59 | 1 | 39 |

→ (A+B+1)/2 → | 55 | 2 | 35 |

COMPARISON WITH β  LARGER SMALLER
WHICH IS LARGER?   B    —

ADDα →

| R | G | B |
|---|---|---|
| 55 | 2 | 35 |

ROUNDING/TRUNCATION → REPRESENTATIVE VALUES

⟨COMPRESSED DATA⟩

| R | G | B |
|---|---|---|
| 7 | 1 | 4 |

|   | R | G | B |
|---|---|---|---|
| C | 4 | 4 | 100 |
| D | 100 | 1 | 2 |

ADDα →

|   | R | G | B |
|---|---|---|---|
| C | 14 | 14 | 110 |
| D | 115 | 16 | 17 |

ROUNDING/TRUNCATION →

|   | R | G | B |
|---|---|---|---|
| C | 1 | 1 | 7 |
| D | 7 | 1 | 1 |

Fig. 13A

| COMPRESSION TYPE RECOGNITION BITS (3 bits) | FORM RECOGNITION DATA (2 bits) | DATA FOR TWO PIXELS | | | DATA FOR TWO PIXELS | | | LARGE-SMALL RECOGNITION DATA (1 bit × 0~6) | β COMPARISON RESULT DATA (1 bit × 6) |
|---|---|---|---|---|---|---|---|---|---|
| | | R REPRESENTATIVE VALUE #1 (5 or 6 bits) | G REPRESENTATIVE VALUE #1 (5 or 6 bits) | B REPRESENTATIVE VALUE #1 (5 or 6 bits) | R REPRESENTATIVE VALUE #2 (5 or 6 bits) | G REPRESENTATIVE VALUE #2 (6 or 7 bits) | B REPRESENTATIVE VALUE #2 (5 or 6 bits) | | |

TOTAL 48 BITS
(DATA COMPRESSION RATIO 50%)

Fig. 13B

| COMPRESSION TYPE RECOGNITION BITS (3 bits) | FORM RECOGNITION DATA (2 bits) | DATA FOR TWO PIXELS | | | DATA FOR TWO PIXELS | | | LARGE-SMALL RECOGNITION DATA (1 bit × 0~6) |
|---|---|---|---|---|---|---|---|---|
| | | R REPRESENTATIVE VALUE #1 (8 or 9 bits) | G REPRESENTATIVE VALUE #1 (8 or 9 bits) | B REPRESENTATIVE VALUE #1 (8 or 9 bits) | R REPRESENTATIVE VALUE #2 (8 or 9 bits) | G REPRESENTATIVE VALUE #2 (8 or 9 bits) | B REPRESENTATIVE VALUE #2 (7 or 8 bits) | β COMPARISON RESULT DATA (1 bit × 6) |

TOTAL 64 BITS
(DATA COMPRESSION RATIO 66.7%)

Fig. 14A

⟨(2×2) PIXEL COMPRESSION⟩

⟨ORIGINAL IMAGE DATA⟩

|   | R   | G  | B  |
|---|-----|----|----|
| A | 50  | 2  | 30 |
| B | 59  | 1  | 39 |
| C | 100 | 80 | 8  |
| D | 100 | 85 | 2  |

PIXELS A AND B: HIGH CORRELATION
PIXELS C AND D: HIGH CORRELATION

|   | R  | G | B  |
|---|----|---|----|
| A | 50 | 2 | 30 |
| B | 59 | 1 | 39 |

(A+B+1)/2 → 55  2  35

COMPARISON WITH β  LARGER  SMALLER  LARGER
WHICH IS LARGER?    B       —       B

ADD α →

| R  | G | B  |
|----|---|----|
| 55 | 2 | 35 |

ROUNDING/TRUNCATION → REPRESENTATIVE VALUE #1

⟨COMPRESSED DATA (A,B)⟩

| R | G | B |
|---|---|---|
| 7 | 1 | 4 |

|   | R   | G  | B |
|---|-----|----|---|
| C | 100 | 80 | 8 |
| D | 100 | 85 | 2 |

(C+D+1)/2 → 100  83  5

COMPARISON WITH β  SMALLER  LARGER  LARGER
WHICH IS LARGER?    —        D       C

ADD α →

| R   | G  | B  |
|-----|----|----|
| 110 | 93 | 15 |

ROUNDING/TRUNCATION → REPRESENTATIVE VALUE #2

⟨COMPRESSED DATA (C,D)⟩

| R  | G  | B |
|----|----|---|
| 28 | 23 | 2 |

Fig. 14B (2×2) PIXEL DECOMPRESSION

⟨COMPRESSED DATA (A,B)⟩

| | R | G | B |
|---|---|---|---|
| REPRESENTATIVE VALUES #1 | 7 | 1 | 4 |

LEFT BIT SHIFT →

| | R | G | B |
|---|---|---|---|
| | 56 | 4 | 32 |

COMPARISON WITH β: LARGER SMALLER LARGER

SUBTRACT α →

| | R | G | B |
|---|---|---|---|
| | 56 | 4 | 32 |

COMPARISON WITH β: LARGER SMALLER LARGER

WHICH IS LARGER? B — B

ADD +5 OR −5 BASED ON WHICH IS LARGER BETWEEN A AND B

⟨DECOMPRESSED DATA (A,B)⟩

| | R | G | B |
|---|---|---|---|
| A | 51 | 4 | 27 |
| B | 61 | 4 | 37 |

⟨COMPRESSED DATA (C,D)⟩

| | R | G | B |
|---|---|---|---|
| REPRESENTATIVE VALUES #2 | 28 | 23 | 2 |

COMPARISON WITH β: SMALLER LARGER SMALLER

WHICH IS LARGER? — D C

LEFT BIT SHIFT →

| | R | G | B |
|---|---|---|---|
| | 112 | 92 | 16 |

COMPARISON WITH β: SMALLER LARGER LARGER

SUBTRACT α →

| | R | G | B |
|---|---|---|---|
| | 102 | 82 | 6 |

COMPARISON WITH β: SMALLER LARGER LARGER

WHICH IS LARGER? — D C

ADD +5 OR −5 BASED ON WHICH IS LARGER BETWEEN C AND D

⟨DECOMPRESSED DATA (C,D)⟩

| | R | G | B |
|---|---|---|---|
| C | 102 | 77 | 11 |
| D | 102 | 87 | 1 |

Fig. 15A

| COMPRESSION TYPE RECOGNITION BITS (4bits) | Ymin (10bits) | Ydist0 (4bits) | Ydist1 (4bits) | Ydist2 (4bits) | ADDRESS (2bits) | Cb' (10bits) | Cr' (10bits) |

TOTAL 48 BITS
(DATA COMPRESSION RATIO 50%)

Fig. 15B

| COMPRESSION TYPE RECOGNITION BITS (4bits) | Ymin (12bits) | Ydist0 (7bits) | Ydist1 (7bits) | Ydist2 (7bits) | ADDRESS (2bits) | Cb' (12bits) | Cr' (12bits) | PADDING (1bit) |

TOTAL 64 BITS
(DATA COMPRESSION RATIO 66.7%)

Fig. 16A (4×1) PIXEL COMPRESSION

⟨ORIGINAL IMAGE DATA⟩

| | R | G | B |
|---|---|---|---|
| A | 10 | 12 | 14 |
| B | 6 | 7 | 8 |
| C | 5 | 4 | 3 |
| D | 0 | 1 | 2 |

(8bits/subpixel)

MATRIX OPERATION →

| | Y | Cb | Cr |
|---|---|---|---|
| A | 48 | 2 | −2 |
| B | 28 | 1 | −1 |
| C | 16 | −1 | 1 |
| D | 4 | 1 | −1 |

→ CALCULATION OF Ymin, Ydist0, Ydist1, Ydist2, Cb' AND Cr'

Fig. 16B (4×1) PIXEL DECOMPRESSION

↓

RESTORE Y_A TO Y_D

↓

| | Y | Cb' | Cr' |
|---|---|---|---|
| A | 48 | 1 | -1 |
| B | 28 | 1 | -1 |
| C | 16 | 1 | -1 |
| D | 4 | 1 | -1 |

MATRIX OPERATION →

⟨DECOMPRESSED DATA⟩

| | R | G | B |
|---|---|---|---|
| A | 11 | 12 | 13 |
| B | 6 | 7 | 8 |
| C | 3 | 4 | 5 |
| D | 0 | 1 | 2 |

(8bits/subpixel)

|  |  | X1X0 | | | |
|---|---|---|---|---|---|
|  |  | 00 | 01 | 10 | 11 |
| Y1Y0 | 00 | 15 | 05 | 01 | 11 |
|  | 01 | 00 | 10 | 14 | 04 |
|  | 10 | 07 | 09 | 13 | 02 |
|  | 11 | 08 | 06 | 03 | 12 |

DISPLAY APPARATUS AND DISPLAY APPARATUS CONTROL CIRCUIT

CROSS REFERENCE TO RELATED APPLICATIONS

This is a National Stage of International Application No. PCT/JP2012/053942, filed Feb. 20, 2012, claiming priority from Japanese Patent Application No. 2011-073478, filed Mar. 29, 2011, the contents of all of which are incorporated herein by reference in their entirety.

TECHNICAL FIELD

The present invention relates to a display apparatus and a display apparatus control circuit, more particularly, to data transmission from a display apparatus control circuit to a display device driver.

BACKGROUND ART

Recently, panel display apparatuses, such as liquid crystal display apparatuses, have become required to display various contents. Examples of contents displayed on panel display apparatuses include still images, 2D (2-dimensional) moving images and 3D (3-dimensional) moving images.

The inventors consider that, in displaying various contents thus described, it is appropriate to switch the frame rate (the number of frame images per unit time) in response to the contents. In the case that a liquid crystal display apparatus is used as a television, use of a frame rate corresponding to the double speed (120 Hz) successfully results in displaying images with reduced blur when contents consisting of still images or including many still images (for example, web contents) are displayed. For displaying a 2D moving image, on the other hand, it is preferable to use a higher frame rate, such as a frame rate corresponding to the triple speed (180 Hz) in order to reduce blur. For displaying a 3D moving image, in which left- and right-eye images are alternatively displayed, it is preferable to use a further higher frame rate, such as a frame rate corresponding to the quadruple speed (240 Hz). Use of a high frame rate independent of the contents may be acceptable if only the image quality is considered; however, the inventors consider that it is preferable that the frame rate is variable, instead of displaying images permanently with a high frame rate, since a high frame rate undesirably increases the power consumption of the display apparatus.

One issue the inventors have recognized in developing a display apparatus configured to vary the frame rate is that the necessary transmission rate of the display data widely varies depending on the frame rate. For example, the transmission rate of the display data for displaying images at the frame rate corresponding to the triple speed is one and a half times as much as that for displaying images at the frame rate corresponding to the double speed. The change in the transmission rate of the display data causes two problems. One is that the anti-EMI design of the printed circuit board and the transmission cables is made difficult. The changes in the transmission rate of the display data enlarge the frequency range of the EMI and this makes it difficult to take anti-EMI measures. Another problem is that, when a clock signal used in the data transmission is generated by a PLL (phase locked loop) or a DLL (delay locked loop), it is necessary to re-lock the PLL or DLL when the transmission rate of the display data is changed. The transmission of the display data is not allowed until the re-lock of the PLL or DLL is completed and this is not preferable for displaying images.

A disclosure of transmission of display data in a display apparatus is found, for example, in Japanese Patent Application Publication No. 2010-141775 A. This publication discloses a technique in which display data are stored in a frame memory after the display data are compressed and a display panel is driven in response to decompressed data obtained by decompressing the compressed data read from the frame memory. In this technique, the data compression ratio is adjusted depending on the display image. The data compression ratio is set high for reducing the power consumption for a display image which does not experience severe image quality deterioration even when the data compression ratio is large. For a display image which suffers from severe image quality deterioration when the data compression ratio is large, the data compression ratio is set low to maintain a sufficient image quality in displaying images in response to the decompressed data.

Also, Japanese patent gazette No. 4,507,265 B also discloses a technique in which display data are stored in a memory after the display data are compressed. This gazette discloses that the compression method is selected in response to the correlation among pixel data of four pixels.

The above-described techniques, however, do not address the changes in the necessary transmission rate of the display data, which are accompanied by the changes in the frame rate.

CITATION LIST

Patent Literature

[Patent Literature 1] Japanese Patent Application Publication No. 2010-141775 A
[Patent Literature 2] Japanese Patent Gazette No. 4507265 B

SUMMARY

Therefore, an objective of the present invention is to provide a display apparatus and a display apparatus control circuit which address the problem of changes in the transmission rate of the display data accompanied by changes in the frame rate.

In one aspect of the present invention, a display apparatus includes: a display device; a display device driver which drives the display device; a compression section adapted to an operation of generating compression data by compression processing performed on image data; and a transmission section which, when receiving compressed data from the compression section, transmits the compressed data to the display device driver by using a serial data signal. The compression section performs the compression processing with a data compression ratio selected in response to a frame rate with which the display device driver drives the display device. The display device driver receives the serial data signal from the transmission section, generates decompressed data by decompressing the compressed data transmitted by the serial data signal, and drives the display device in response to the decompressed data. The data compression ratio used in the compression processing is set so that the transmission rate of the serial data signal from the transmission section to the display device driver is kept constant independently of the frame rate.

In another aspect of the present invention, a display apparatus control circuit which controls a display device driver driving a display device includes: a compression section adapted to an operation of generating compression data by compression processing performed on image data; and a transmission section which, when receiving compressed data from the compression section, transmits the compressed data to the display device driver by using a serial data signal. The compression section performs the compression processing with a data compression ratio selected in response to a frame rate with which the display device driver drives the display device. The display device driver receives the serial data signal from the transmission section, generates decompressed data by decompressing the compressed data transmitted by the serial data signal, and drives the display device in response to the decompressed data. The data compression ratio is set so that the transmission rate of the serial data signal from the transmission section to the display device driver is kept constant independently of the frame rate.

The present invention provides a display apparatus and a display apparatus control circuit which address a problem of changes in the transmission rate of display data accompanied by changes in the frame rate.

BRIEF DESCRIPTION OF DRAWINGS

FIG. 4 is a block diagram illustrating the configuration of a display apparatus of a second embodiment of the present invention;

FIG. 8 is a flowchart illustrating an example of the procedure of selecting a compression method;

FIG. 9A is a diagram illustrating the format of (1×4) pixel compressed data for a data compression ratio of 50%;

FIG. 9B is a diagram showing the format of (1×4) pixel compressed data for a data compression ratio of 66.7%;

FIG. 10A is a conceptual illustration illustrating the processing contents of (1×4) pixel compression;

FIG. 10B is a conceptual illustration illustrating the contents of decompression processing of (1×4) compressed data;

FIG. 11A is a diagram illustrating the format of (2+1×2) pixel compressed data for a data compression ratio of 50%;

FIG. 11B is a diagram illustrating the format of (2+1×2) pixel compressed data for a data compression ratio of 66.7%;

FIG. 12A is a conceptual illustration illustrating the processing contents of (2+1×2) pixel compression;

FIG. 13A is a diagram illustrating the format of (2×2) pixel compressed data for a data compression ratio of 50%;

FIG. 13B is a diagram illustrating the format of (2×2) pixel compressed data for a data compression ratio of 66.7%;

FIG. 14A is a conceptual illustration illustrating the processing contents of (2×2) pixel compression;

FIG. 14B is a conceptual illustration illustrating the contents of decompression processing of (2×2) compressed data;

FIG. 15A is a diagram illustrating the format of (4×1) pixel compressed data for a data compression ratio of 50%;

FIG. 15B is a diagram illustrating the format of (4×1) pixel compressed data for a data compression ratio of 66.7%;

FIG. 16A is a conceptual illustration illustrating the processing contents of (4×1) pixel compression;

FIG. 16B is a conceptual illustration illustrating decompression processing of compressed data compressed by (4×1) pixel compression;

DESCRIPTION OF EMBODIMENTS

First Embodiment

Figure 1:
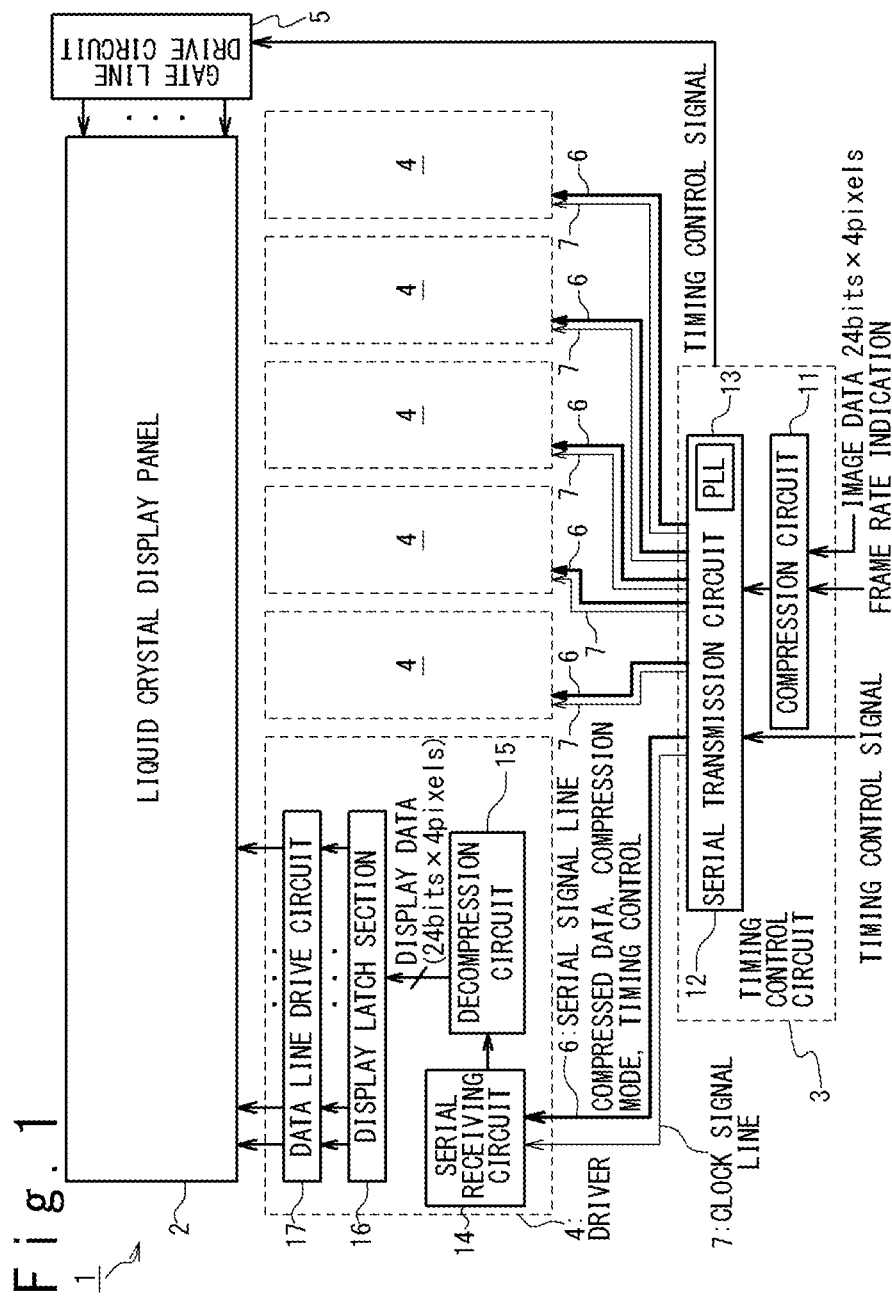
FIG. 1 is a block diagram illustrating the configuration of a display apparatus of a first embodiment of the present invention.

FIG. 1 is a block diagram showing the configuration of a display apparatus according to a first embodiment of the present invention. In this embodiment, a display apparatus according to the present invention is applied to a liquid crystal display apparatus 1. Although an embodiment in which the present invention is applied to the liquid crystal display apparatus 1 is described in the following, it would be apparent to the person skilled in the art that the present invention is applicable to other display apparatuses (such as, PDP (plasma display panel) display apparatuses and organic EL (electroluminescence) display apparatuses).

The liquid crystal display apparatus 1 is configured to display images on a liquid crystal display panel 2 in response to image data transmitted from an external device. Placed in the liquid crystal display panel 2 are pixels, data lines (or signal lines) and gate lines (or scan lines). Each pixel includes an R subpixel (a subpixel for displaying red), a G subpixel (a subpixel for displaying green) and a B subpixel (a subpixel for displaying blue). Each subpixel is placed at the intersection of the corresponding data line and gate line. In the following, pixels corresponding to the same gate line are referred to as pixel line.

In this embodiment, image data are fed as data representing the grayscale level of each of the R subpixel, the G subpixel and the B subpixel with eight bits, that is, data representing the grayscale levels of each pixel with 24 bits. It should be noted that the number of bits of the image data is not limited to these numbers.

The liquid crystal display apparatus 1 includes a timing control circuit 3, drivers 4 and a gate line drive circuit 5. The timing control circuit 3 controls the drivers 4 and the gate line drive circuit 5 so that desired images are displayed on the liquid display panel 2. The drivers 4 drive the data lines of the liquid crystal display panel 2 and the gate line drive circuit 5 drives the gate lines of the liquid crystal display panel 2. In this embodiment, the timing control circuit 3, the drivers 4 and the gate line drive circuit 5 are mounted as separate ICs (integrated circuits). The drivers 4 are adapted to vary the frame rate of image display on the liquid crystal display panel 2. As described above, the configuration in which the frame rate is variable is useful for appropriately displaying various contents (such as, the WWW, 2D (2-dimensional) moving images and 3D (3-dimensional) moving images) with reduced power consumption.

In this embodiment, a plurality of drivers 4 are provided in the liquid crystal display apparatus 1, and the timing control circuit 3 and each driver 4 is connected with a peer-to-peer connection. Specifically, the timing control circuit 3 and each driver 4 is connected via a serial signal line 6 and a clock signal line 7 which are dedicated to each driver 4. The data transmission between the timing control circuit 3 and each driver 4 is achieved by serial data transmission via the serial signal line 6. Although an architecture in which a timing controller and drivers are connected by a bus is commonly known with respect to a liquid crystal display apparatus incorporating a plurality of drivers, the architecture of this embodiment in which the timing control circuit 3 and each driver 4 is connected with a peer-to-peer connection is useful, since such architecture allows reducing the transmission rate necessary for data transmission between the timing control circuit 3 and each driver 4.

Schematically, the timing control circuit 3 has two roles. First, the timing control circuit 3 performs an overall timing control of the liquid crystal display apparatus 1 in response to timing control signals fed from an external device. In detail, the timing control circuit 3 controls the operation timings of the drivers 4 and the gate line drive circuit 5 by transmitting various control data to each driver 4 via the serial signal line 6 and transmitting timing control signals to the gate line drive circuit 5. The transmission of the control data from the timing control circuit 3 to each driver 4 is performed in the blanking period of each horizontal synchronization period. The control data transmitted from the timing control circuit 3 to each driver 4 include polarity reversal data and timing control data. Here, the polarity reversal data are data which specifies polarities of drive signals fed to the data lines. On the other hand, the timing control data include data which notify each driver of the starts of each vertical synchronization period and each horizontal synchronization period, data which indicate a data start (that is, data instructing each driver 4 to latch image data) and data which indicate to start driving the data lines. Each driver 4 operates at operation timings in response to the timing control data. The control of the frame rate of image display on the liquid crystal display panel 2 is achieved by using these timing control data.

Second, the timing control circuit 3 feeds image data to each driver 4 via the serial signal line 6. Here, the timing control circuit 3 has the function of feeding image data to each driver 4 after performing compression processing on the image data. The compression processing on image data will be described later in detail. The image data are fed to each driver 4 in the display period in each horizontal synchronization period. A detailed description is given below of the timing control circuit 3 and the drivers 4.

The timing control circuit 3 includes a compression circuit 11 and a serial transmission circuit 12. The compression circuit 11 generates compressed data by performing compression processing on the image data. In this embodiment, the image data are compressed in units of four pixels. This implies that image data are compressed in units of 96 bits, since image data corresponding to one pixel consists of 24 bits as described above.

As described above, the data compression ratio of the compression processing in the compression circuit 11 is variable. In this Specification, the data compression ratio is defined as the ratio of the number of bits of compressed data to the number of bits of the original image data. When compressed data of 48 bits are generated from image data of 96 bits, the data compression ratio is 50% (=1/2). In this embodiment, the data compression ratio of the compression processing is selected from 100% (=1), 66.7% (=2/3) and 50% (=1/2). The data compression ratio of 100% means that the compression circuit 11 outputs the image data as they are without performing compression processing; in the following, however, the data outputted from the compression circuit 11 are referred to as compressed data, including the case that the data compression ratio is 100%.

The compression circuit 11 is fed with frame rate indication data which indicate the frame rate, and the data compression ratio of the compression processing is selected in response to the frame rate indication data. In other words, the data compression ratio is adjusted in response to the frame rate of the image display on the liquid crystal display panel 2. This aims at keeping the transmission rate of the serial data transmission constant by varying the data compression ratio in response to the frame rate as described later. When the frame rate is high, for example, it is required to feed image data of a large data amount to each driver 4 and therefore the data compression ratio is set high to keep the transmission rate of the serial data transmission constant. The compression circuit 11 feeds the compressed data generated by the compression processing and compression mode data indicating the data compression ratio to the serial transmission device 12.

The serial transmission circuit 12 generates a serial data signal which incorporates the compressed data, the compression mode data received from the compression circuit 11, and timing control data to be transmitted to each driver 4, and transmits the serial data signal with a serial data communication. In this embodiment, the serial transmission circuit 12 includes a PLL circuit 13 generating a clock signal and transmits the serial data signal to each driver 4 via the serial signal line 6 in synchronization with the generated clock signal. Additionally, the serial transmission circuit 12 transmits the clock signal generated by the PLL circuit 13 to each driver 4 via the clock signal line 7.

On the other hand, each driver 4 includes a serial receiving circuit 14, a decompression circuit 15, a display latch section 16 and a data line drive circuit 17. The serial receiving circuit 14 receives the serial data signal transmitted from the serial transmission circuit 12 in synchronization with the clock signal fed via the clock signal line 7, and performs sampling on the serial data signal to extract the compressed data, the compression mode data and the timing control data. The extracted compressed data compression mode data and timing control data are forwarded to the decompression circuit 15. The decompression circuit 15 decompresses the received compressed data to generate display data and sequentially forwards the generated display data to the display latch section 16. In this operation, the decompression circuit 15 recognizes the data compression ratio from the compression mode data and decompresses the compressed data in response to the recognized data compression ratio. The display latch section 16 sequentially latches the display data received from the decompression circuit 15. The display latch section 16 of each driver 4 stores the display data of pixels corresponding to the each driver 4 out of pixels of a pixel line. The data line drive circuit 17 drives the data lines in response to the display data latched by the display latch section 16. In response to the display data stored in the display latch section 16, the respective data lines corresponding to the display data are driven in each horizontal synchronization period. It should be noted that, although the configuration of only one driver 4 is illustrated in FIG. 1, other drivers 4 are similarly structured.

Various known compression processing and decompression process may be used as the compression processing performed in the compression circuit 11 and the decompression processing performed in the decompression circuit 15. It should be noted, however, that compression processing and decompression processing preferred for the liquid crystal display apparatus 1 of this embodiment are described in detail later.

Figure 2:
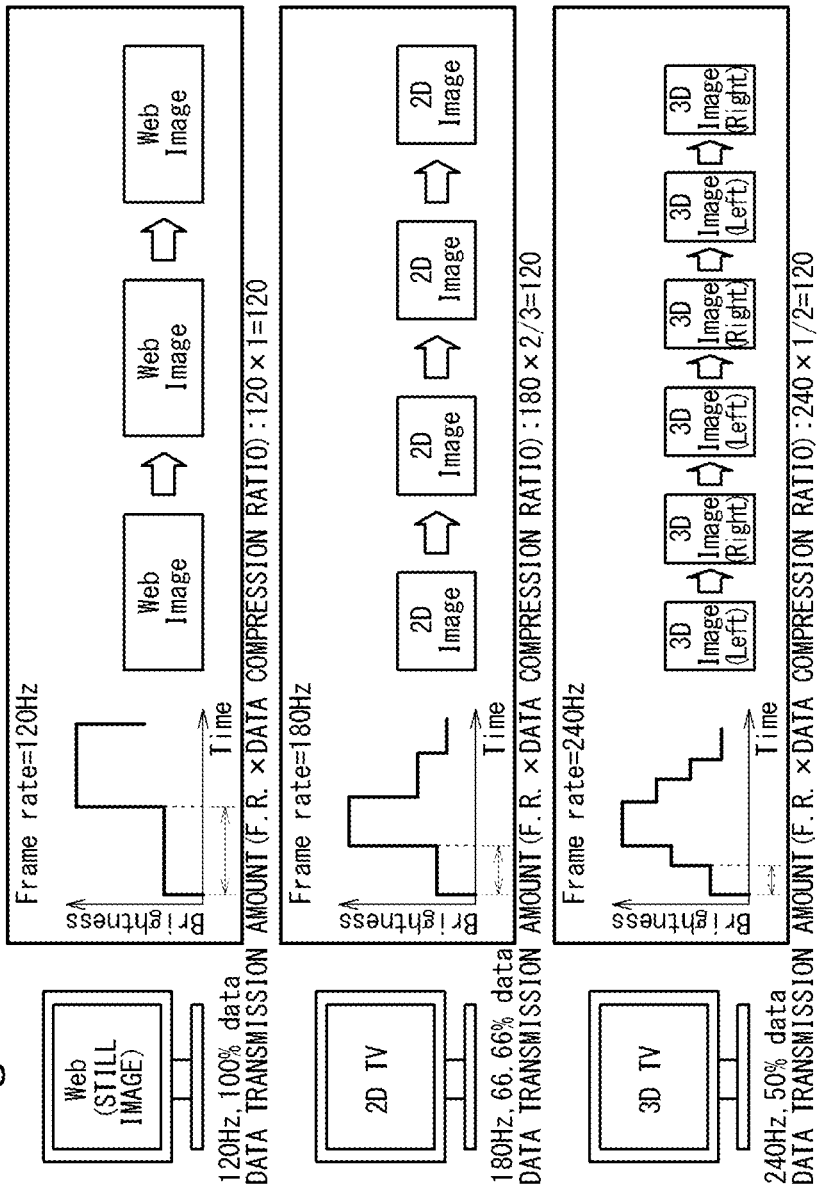
FIG. 2 is a conceptual illustration illustrating the relation among kinds of contents, the frame rate and the data compression ratio.

Next, the operation of the liquid crystal display apparatus 1 of this embodiment is described. As illustrated in FIG. 2, the frame rate of the image display on the liquid crystal display panel 2 is variable in the liquid crystal display apparatus 1 of this embodiment. In this embodiment, the frame rate is selected from 120 Hz (the double speed), 180 Hz (the triple speed) and 240 Hz (the quadruple speed). The frame rate is indicated by the frame rate indication data fed to the timing control circuit 3 and the timing control circuit 3 and the drivers 4 operate to display images at the frame rate indicated by the frame rate indication data.

In this embodiment, the frame rate is switched in response to the contents displayed on the liquid crystal display panel 2. When still images or contents frequently including still images such as the web are displayed, the frame rate is set to 120 Hz. Still images, which do not cause a severe problem in terms of image blur, are displayed at a relatively low frame rate in order to reduce the power consumption. When 2D moving images are displayed, on the other hand, the frame rate is set to a higher value, more specifically, 180 Hz to reduce blur. When 3D moving images, which require alternately displaying left- and right-eye images, are displayed, the frame rate is set to a further higher value, more specifically, 240 Hz.

In addition, the liquid crystal display apparatus 1 is configured to switch the data compression ratio of the compression circuit 11 in response to the switching of the frame rate, and thereby the transmission rate of the serial data transmission from the timing control circuit 3 to each driver 4 is kept constant. In this embodiment, the data compression ratio is switched so that the product of the data compression ratio and the frame rate is kept constant independently of the frame rate. In detail, the data compression ratio is set to 100% (=1) for the frame rate of 120 Hz, to 66.7% (=2/3) for the frame rate of 180 Hz and to 50% (=1/2) for the frame rate of 240 Hz. It should be noted that the product of the frame rate and the data compression ratio is kept to a constant value of 120. The combination of the data compression ratio and the frame rate may be variously modified; it is important that the product of the data compression ratio and the frame rate is kept constant independently of the frame rate.

There are two advantages to keeping the transmission rate of the serial data transmission constant by adjusting the data compression ratio in response to the frame rate. First, anti-EMI designs of the printed circuit board and transmission cables are facilitated. In this embodiment, since the transmission rate of the serial data transmission is kept constant, the frequency range of the EMI is narrowed and this makes it easy to take anti-EMI measures.

Second, the need of re-locking the PLL circuit 13 is eliminated, since it is not necessary to switch the frequency band of the clock signal generated by the PLL circuit 13 in response to the frame rate. If the frame rate is switched without adjusting the data compression ratio, this necessitates increasing or decreasing the data transmission rate in the serial data transmission, causing a necessity of switching the frequency band of the clock signal. When the frame rate is switched from 120 Hz to 180 Hz with the data compression rate kept constant, the data transmission amount in the serial data transmission is increased up to one and a half times and the data transmission rate is also increased up to one and a half times. This necessitates switching the frequency band of the clock signal generated by the PLL circuit 13 to a frequency band including the frequency of one and a half times of the original frequency. One issue is that it is necessary to re-lock the PLL circuit 13 when the frequency band of the clock signal generated by the PLL circuit 13 is switched. This implies the display data cannot be transmitted until the re-lock is completed, which is not preferable for displaying images. In this embodiment, it is not necessary to switch the frequency band of the clock signal generated by the PLL circuit 13, since the transmission rate of the serial data transmission is kept constant even when the frame rate is switched. This offers an advantage of eliminating the necessity of re-locking the PLL circuit 13.

Figure 3A:
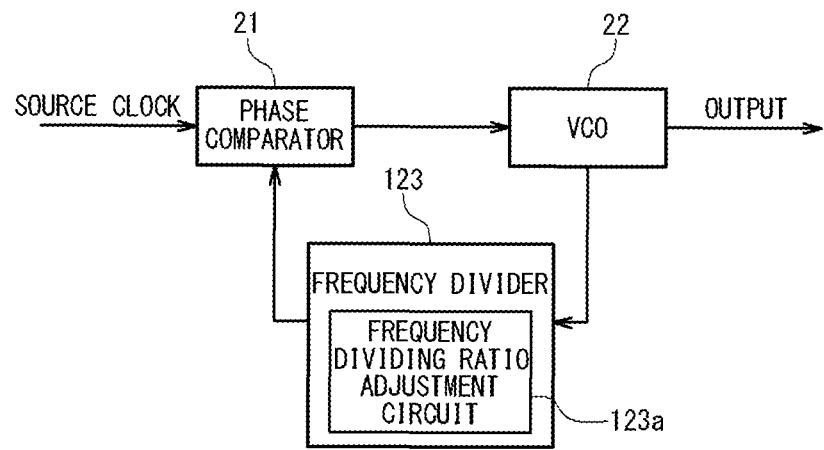
FIG. 3A is a block diagram illustrating a circuit configuration of a commonly used PLL circuit.
Figure 3B:
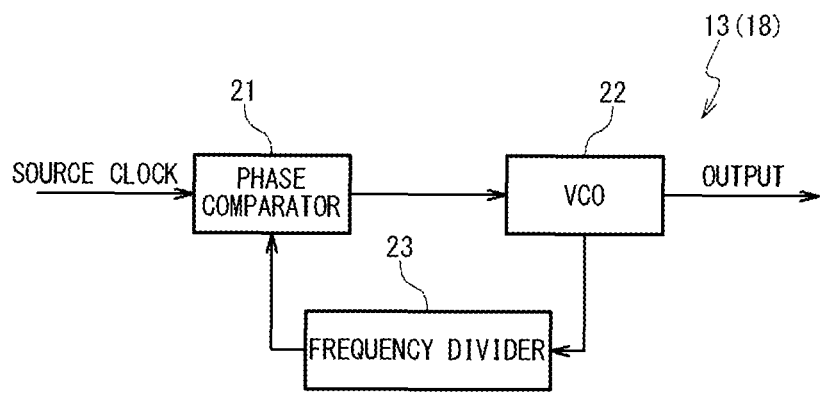
FIG. 3B is a block diagram illustrating a preferred circuit configuration of a PLL circuit of the first embodiment.

The elimination of the necessity of switching the clock signal generated by the PLL circuit 13 also offers an advantage that the circuit configuration of the PLL circuit 13 can be simplified. FIG. 3A illustrates the circuit configuration of a commonly used PLL circuit and FIG. 3B illustrates the circuit configuration of the PLL circuit 13 of this embodiment. Known as a commonly known PLL circuit is a configuration which includes a phase comparator 21a VCO (voltage-controlled oscillator) 22 and a frequency divider 123 as shown in FIG. 3A. The phase comparator 21 outputs an output voltage corresponding to the phases of a source clock and an output signal of the frequency divider 123 and The VCO 22 outputs an output clock signal in response to the output voltage received from the phase comparator 21. The frequency divider 123 outputs the output signal by performing frequency-dividing on the output clock signal. In general, a low pass filter (LPF) is often provided between the phase comparator 21 and the VCO 22; however, the low pass filter is not illustrated in FIG. 3A.

In general, the frequency band of the output clock signal outputted from the VCO 22 is not so wide. Accordingly, the frequency dividing ratio of the frequency divider 123 is switched by a frequency dividing ratio adjustment circuit 123 provided in the frequency divider 123, when the frequency of the output clock signal is to be widely changed. This implies that the use of the configuration in which the frequency band of the clock signal generated by the PLL circuit 13 is switched in response to the switching of the frame rate necessitates using such a circuit configuration that the frequency dividing ratio of the frequency divider 123 is switchable as illustrated in FIG. 3A.

In this embodiment, on the other hand, the frequency band of the clock signal generated by the PLL circuit 13 is not switched even when the frame rate is switched. This allows using a circuit configuration using a frequency divider 23 which does not have the function of switching the frequency dividing ratio as illustrated in FIG. 3B. The configuration of the frequency divider 23 can be simplified by removing the function of switching the frequency dividing ratio from the frequency divider 23. This is advantageous in implementation of the PLL circuit 13. It should be noted that the frequency divider 23 is not necessary when a clock signal having the same frequency as the source clock is generated. In this case, the output of the VCO 22 is directly connected to the input of the phase comparator 21 or a signal of the same frequency as the output of the VCO 22 is fed to the input of the phase comparator 21 via a certain circuit (for example, a delay circuit).

A DLL (delay locked loop) circuit may be used in place of the PLL circuit 13. Also in this case, it is not necessary to provide the DLL circuit with the function of switching the frequency band, since the transmission rate of the serial data transmission is kept constant. This contributes the simplification of the configuration of the DLL circuit.

As described above, the frame rate is switched in response to the contents displayed on the liquid crystal display panel 2 in the liquid crystal display apparatus 1 of this embodiment. Furthermore, the data compression ratio of the compression circuit 11 is switched in response to the switching of the frame rate and thereby the transmission rate of the serial data transmission from the timing control circuit 3 to each driver 4 is kept constant. This facilitates taking anti-EMI measures and also eliminates the necessity of re-locking the PLL circuit 13. In addition, this embodiment eliminates the necessary of switching the frequency band of the clock signal generated by the PLL circuit 13, allowing simplification of the circuit configuration of the PLL circuit 13.

Second Embodiment

FIG. 4 is a block diagram illustrating the configuration of the display apparatus according to a second embodiment of the present invention. Used in this embodiment is an architecture in which a clock recovery is performed in each driver 4 from the serial data signal transmitted to the driver 4 via the serial signal line 6. The clock signal line 7 is not provided in this embodiment. The architecture in which a clock recovery from the serial data signal is performed is effective for reducing the number of signal lines of the cable which provides connection between the timing control circuit 3 and each driver 4. One example of a serial data transmission technique adapted to such architecture is LVDS (low voltage differential signaling).

In connection with such modification, a PLL circuit 18 is provided in the serial receiving circuit 14*a* of each driver 4 in this embodiment. The PLL circuit 18 generates a clock signal synchronous with the serial data signal transmitted to the driver 4. The serial receiving circuit 14A performs sampling on the serial data signal at timings synchronous with the clock signal generated by the PLL circuit 18 to extract the compressed data, the compression mode data and the timing control data. It should be noted that a DLL circuit may be used in place of the PLL circuit 18.

The configuration and operation of the liquid crystal display apparatus 1 except for those described above are same as the first embodiment. That is, as is the case with the first embodiment, the frame rate is also switched in response to the contents displayed on the liquid crystal display panel 2 in this embodiment. Furthermore, the data compression ratio of the compression circuit 11 is switched in response to the switching of the frame rate and thereby the transmission rate of the serial data transmission from the timing control circuit 3 to each driver 4 is kept constant.

This embodiment, in which PLL circuits are provided not only in the serial transmission circuit 12 but also the serial receiving circuit 14A, offers a larger advantage by the transmission rate of the serial data transmission being kept constant. In this embodiment, in which the transmission rate of the serial data transmission is kept constant, it is not necessary to switch the frequency band of the clock signal in any of the PLL circuit 13 of the serial transmission circuit 12 and the PLL circuit 18 of the serial reception circuit 14A. This implies that an operation of re-locking is not necessary for any of the PLL circuits 13 and 18 (as long as no malfunction occurs). Since both of the PLL circuit 13 of the serial transmission circuit 12 and the PLL circuit 18 of the serial receiving circuit 14A are required to normally operate in order to achieve the serial data transmission between the timing control signal 3 and each driver 4, it is very advantageous that it is not necessity to re-lock any of the PLL circuits 13 and 18. In addition, the simple circuit configuration illustrated in FIG. 3B, which does not provide the function of switching the frequency dividing ratio, can be used for the PLL circuit 18 as well as the PLL circuit 13. When the circuit configuration illustrated in FIG. 3B is used for the PLL circuit 18, a recovery signal obtained by performing a waveform recovery on the serial data signal is inputted to the phase comparator 21 in place of the source clock signal.

Third Embodiment

Figure 5:
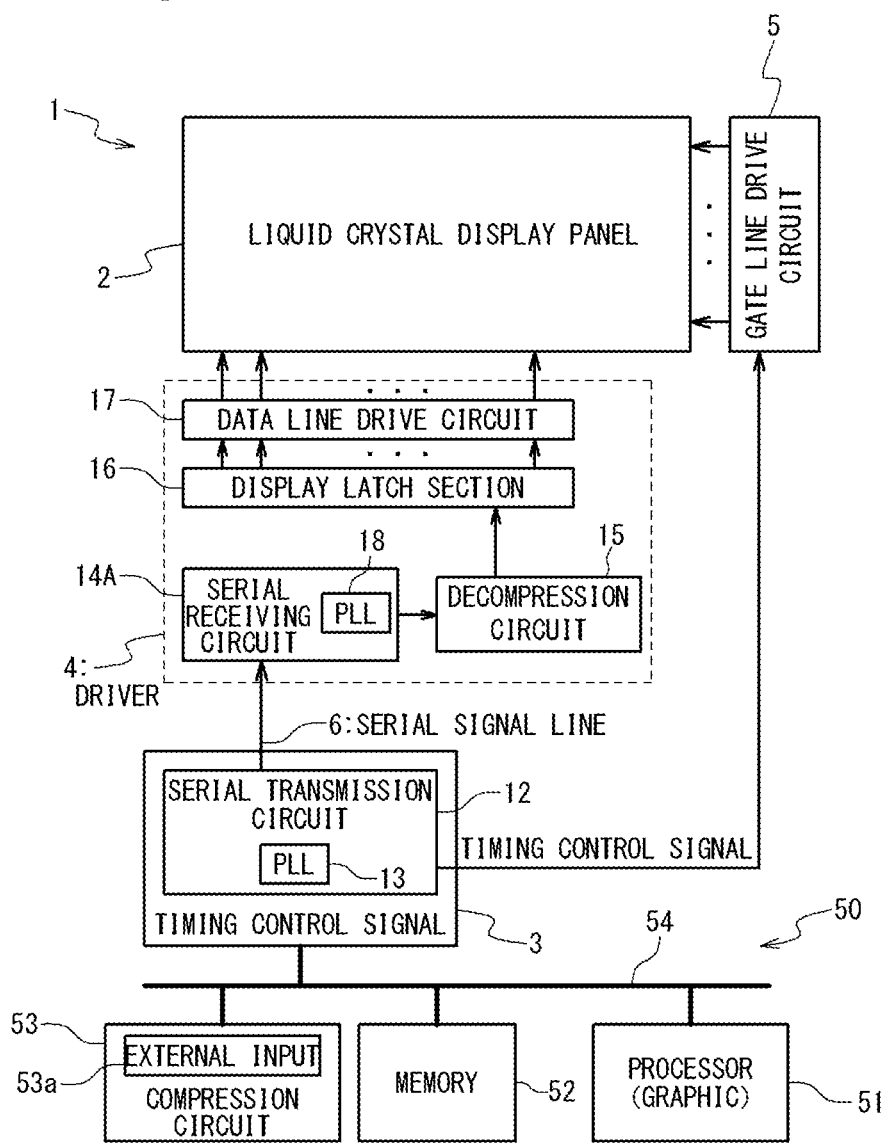
FIG. 5 is a block diagram showing the configuration of a display apparatus of a third embodiment of the present invention.

FIG. 5 is a block diagram illustrating the display apparatus according to a third embodiment of the present invention. In this embodiment, a display apparatus according to the present invention is applied to an image processing apparatus 50 including the liquid crystal display apparatus 1. The image processing apparatus 50 includes a processor 51, a memory 52 and an external input interface 53. A CPU (central processing unit) or a DSP (digital signal processor) may be used as the processor 51, for example. The processor 51 performs graphic processing, using the memory 52 as a work area. The external input interface 53 is connected to an external device, such as an optical disk drive. In this embodiment, the external input interface 53 includes a compression circuit 53*a* and the compression circuit 53*a* performs compression processing on image data received by the external input interface 53 from the external device. The operation of the compression circuit 53*a* is same as that of the compression circuit 11 in the first and second embodiments. The compression circuit 53*a* is fed with the frame rate indication data which indicates the frame rate and the compression circuit 53*a* performs compression processing on the image data with the data compression ratio selected in response to the frame rate indication data. The data generated by the compression processing are forwarded to the timing control circuit 3 via a bus 54 and then transmitted to the drivers 4 by the serial data transmission.

Also in this embodiment, as is the case with the first and second embodiments, the frame rate is switched in response to the contents displayed on the liquid crystal display panel 2. Furthermore, the data compression ratio of the compression circuit 11 is switched in response to the switching of the frame rate; this allows the transmission rate of the serial data transmission from the timing control circuit 3 to the drivers 4 to be kept constant.

Although the frame rate is set depending on the kind of the contents to be displayed in the above-described embodiments, the present invention is applicable to the case when the frame rate is adjusted depending on a factor other than the kind of the contents.

(Compression Processing and Decompression Processing)

In the following, a description is given of the compression processing performed in the compression circuit 11 and the decompression processing performed in the decompression circuit 15 in the above-described embodiments.

1. Configuration of Block

Figure 6:
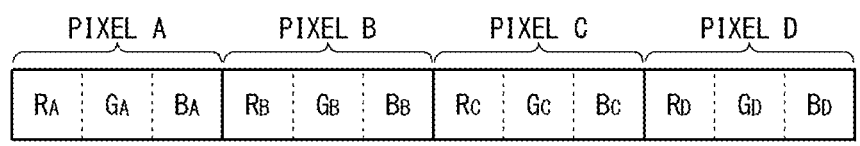
FIG. 6 is a conceptual illustration showing an example of the configuration of a block, which is unit data of compression processing.

As described above, block coding, in which compression is performed in units of blocks each consisting of a plurality of pixels, is used as the compression processing in the present embodiments. More specifically, in the present embodiments, each block consists of four pixels belonging to the same pixel line, and image data of the four pixels (total 96 bits) are collectively compressed. FIG. 6 illustrates the arrangement of four pixels in each block; four pixels included in each block may be referred to as pixel A, pixel B, pixel C and pixel D, respectively, in the following. Each of pixels A to D includes an R subpixel, a G subpixel and a B subpixel. The R subpixel, G subpixel and B subpixel of pixel A are denoted by symbols $R_A$, $G_A$ and $B_A$, respectively. The same goes for pixels B to D. In the present embodiments, the subpixels $R_A$, $G_A$, $B_A$, $R_B$, $G_B$, $B_B$, $R_C$, $G_C$, $B_C$, $R_D$, $G_D$ and $B_D$ of four pixels of each block are positioned in the same pixel line and connected to the same gate line. In the following, a block to be subjected to compression processing is referred to as target block.

2. Overview of Configurations and Operations of Compression Circuit and Decompression Circuit In the present embodiments, the compression circuit 11 is adapted to compress image data with any of the following five compression methods:

No-compression
(1×4) pixel compression
(2+1×2) pixel compression
(2×2) pixel compression
(4×1) pixel compression As described above, the no-compression is a method of outputting image data as compressed data as they are, and used to set the data compression ratio to 100% (=1). The (1×4) pixel compression is a method in which a process to reduce the number of bit planes is performed on each of the four pixels of the target block, independently. The (1×4) pixel compression is advantageous when the correlation among image data of the four pixels is low. The (2+1×2) pixel compression is a method in which a representative value representing image data of two pixels out of the four pixels of the target block is determined and a process to reduce the number of bit planes is performed on each of the other two pixels. The (2+1×2) pixel compression is advantageous when the correlation of image data of two pixels out of the four pixels is high, and the correlation of the image data of the other two pixels is low. The (2×2) pixel compression is a method in which four pixels of the target block is classified into two pairs each consisting of two pixels, and representative values for representing the image data for each pair are calculated to thereby compress the image data. The (2×2) pixel compression is advantageous when the correlation of image data of two pixels out of four pixels is high, and the correlation of the image data of the other two pixels is also high. As described above, the (4×1) pixel compression is a method in which representative values for representing the imaged data of the four pixels of the target block are calculated to thereby compress the image data. The (4×1) pixel compression is advantageous when the correlation among the image data of the four pixels of the target block is high.

The data compression ratio is variable for the four compression method other than the no-compression (that is, (1×4) pixel compression, (2+1×2) pixel compression, (2×2) pixel compression and (4×1) pixel compression). In any of these four compression methods, the data compression ratio is set to 66.7% (=2/3) for the frame rate of 180 Hz (corresponding to the triple speed), and to 50% (=1/2) for the frame rate of 240 Hz (corresponding to the quadruple speed) in the present embodiments.

In addition, when the data compression ratio is not 100%, the compression method is selected from the (1×4) pixel compression, the (2+1×2) pixel compression, the (2×2) pixel compression and the (4×1) pixel compression, in response to the correlation among image data of the four pixels which form the target block. For example, the (4×1) pixel compression is used when the correlation among the image data of the four pixels is high, and the (2×2) pixel compression is used when the correlation of the image data of two pixels out of the four pixels is high, and the correlation of the image data of the other two pixels is also high. When the data compression ratio is 100%, the no-compression is selected independently of the correlation among the four pixels forming the target block.

Figure 7A:
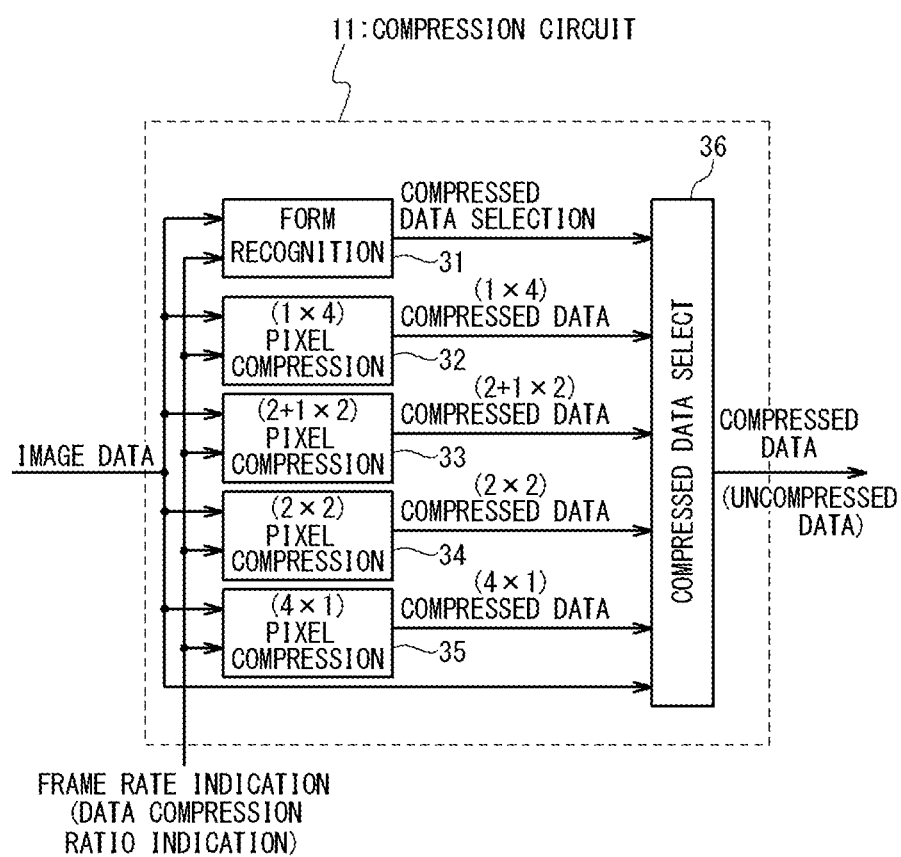
FIG. 7A is a block diagram illustrating an example of the configuration of a compression circuit.

To perform the operation as described above, as illustrated in FIG. 7A, the compression circuit 11 includes a form recognition section 31, a (1×4) pixel compression section 32, a (2+1×2) pixel compression section 33, a (2×2) pixel compression section 34, a (4×1) pixel compression section 35, and a compressed data selection section 36.

When receiving the image data of the pixels of the target block, the form recognition section 31 recognizes the correlation among the received image data of the pixels. For example, the form recognition section 31 recognizes which combination of the pixels arranged in one row and four columns has a high correlation in the image data or which pixel has a low correlation with other pixels in the image data. Furthermore, the form recognition section 31 generates compressed data selection data which indicate which of the five compression methods: the no compression, the (1×4) pixel compression, the (2+1×2) pixel compression, the (2×2) pixel compression, and the (4×1) pixel compression should be used in response to the result of the recognition and the data compression ratio to be used.

The (1×4) pixel compression section 32, the (2+1×2) pixel compression section 33, the (2×2) pixel compression section 34, and the (4×1) pixel compression section 35 perform the above-described (1×4) pixel compression, (2+1×2) pixel compression, (2×2) pixel compression, and (4×1) pixel compression, respectively, and thereby generate (1×4) compressed data, (2+1×2) compressed data, (2×2) compressed data, and (4×1) compressed data, respectively. In the present embodiments, the (1×4) pixel compression section 32, the (2+1×2) pixel compression section 33, the (2×2) pixel compression section 34, and the (4×1) pixel compression section 35 are fed with the frame rate indication data, and switch the data compression ratio of the compression processing in response to the frame rate. As described above, the data compression ratio is set to 66.7% (=2/3) for the frame rate of 180 Hz (corresponding to the triple speed) and the data compression ratio is set to 50% (=1/2) for the frame rate of 240 Hz (corresponding to the quadruple speed).

The compressed data selection section 36 selects any of the original image data, the (1×4) compressed data, the (2+1×2) compressed data, the (2×2) compressed data, and the (4×1) compressed data in response to the compressed data selection data received from the form recognition section 31, and outputs the selected data as the resultant compressed data. When any one of the (1×4) compressed data, the (2+1×2) compressed data, the (2×2) compressed data, and the (4×1) compressed data is selected as the resultant compressed data, the resultant compressed data include one or more compression type recognition bits indicating which one is used out of the four compression methods. The compressed data outputted from the compressed data selection section 36 are forwarded to the serial transmission circuit 12.

Figure 7B:
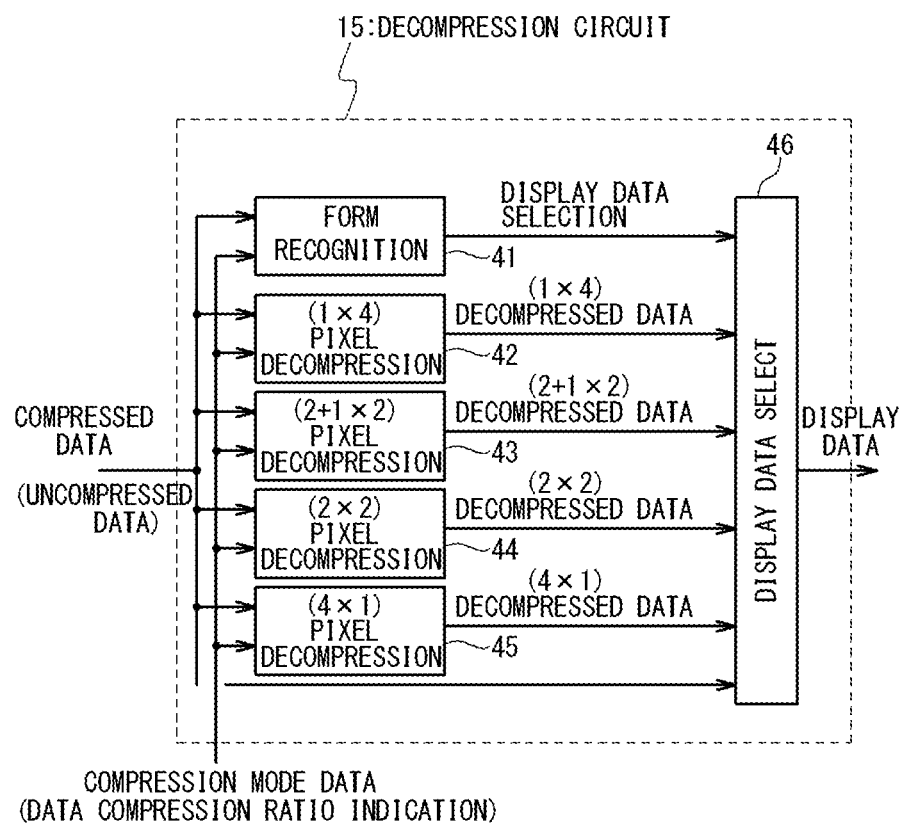
FIG. 7B is a block diagram illustrating an example of the configuration of a decompression circuit.

The decompression circuit 15, which is provided on the receiving side (that is, in the driver 4), determines which one of the above-described five compression methods is used to perform the compression processing for the compressed data received from the serial receiving circuit 14 (14A), recognizes the data compression ratio from the compression mode data, and decompresses the compressed data by the decompression method adapted to the used compressed method and the data compression ratio. To perform such an operation, as shown in FIG. 7B, the decompression circuit 15 includes the form recognition section 41, an (1×4) pixel decompression section 42, and a (2+1×2) pixel decompression section 43, (2×2) pixel decompression section 44, a (4×1) pixel decompression section 45, and the display data selection section 46.

The (1×4) pixel decompression section 42, the (2+1×2) pixel decompression section 43, the (2×2) pixel decompression section 44, and the (4×1) pixel decompression section 45 has the function of decompressing the compressed data generated by the (1×4) pixel compression, the (2+1×2) pixel compression, the (2×2) pixel compression, and the (4×1) pixel compression, respectively. The (1×4) pixel decompression section 42, the (2+1×2) pixel decompression section 43, the (2×2) pixel decompression section 44, and the (4×1) pixel decompression section 45 recognizes the data compression ratio from the compression mode data and performs the decompression processing in accordance with the recognized data compression ratio. Hereinafter, the decompressed data obtained by decompressing the compressed data by the (1×4) pixel decompression section 42, the (2+1×2) pixel decompression section 43, the (2×2) pixel decompression section 44, and the (4×1) pixel decompression section 45 are referred to as (1×4) decompressed data, (2+1×2) decompressed data, (2×2) decompressed data and (4×1) decompressed data, respectively.

The form recognition section 41 recognizes the compression method actually used for the compression processing from the compression type recognition bits and the compression mode data, and generates display data selection data specifying which of the (1×4) decompressed data, the (2+1×2) decompressed data, the (2×2) decompressed data, the (4×1) decompressed data and the compressed data is to be selected as the display data. The display data selection section 46 outputs any of the (1×4) decompressed data, the (2+1×2) decompressed data, the (2×2) decompressed data, the (4×1) decompressed data and the compressed data in response to the display data selection data. It should be noted that the compressed data are selected as the display data as they are, only when the data compression ratio is 100% (that is, when the no-compression is used as the compression method). The display data outputted from the decompression circuit 15 are fed to the display latch section 16 and the data line drive circuit 17 and used to drive the liquid crystal display panel 2.

In the following, a description is given of the recognition method of the correlation among the image data of pixels arranged in one row and four columns and details of the four compression methods other than the no-compression. In the following description, the grayscale values of the R subpixels of the pixels A, B, C, and D are denoted by $R_A$, $R_B$, $R_C$, and $R_D$, respectively. Also, the grayscale values of the G subpixels of the pixels A, B, C, and D are denoted by $G_A$, $G_B$, $G_C$, and $G_D$, respectively, and the grayscale values of the B subpixels of the pixels A, B, C, and D are denoted by $B_A$, $B_B$, $B_C$, and $B_D$, respectively.

3. Selection of Compression Method in Response to Correlation Among Pixels

When the data compression ratio is not 100% (that is, when a compression method other than the no-compression is selected), the compression method is selected in response to the correlation among the four pixels. More specifically, the compression circuit 11 determines which of the following cases is valid for the image data of the four pixels, which are arranged in one row and four columns, of the target block:

Case A: The correlation is low for any combinations of the image data of the four pixels.

Case B: There exists a high correlation between the image data of two pixels, while the image data of the other two pixels have a low correlation with the preceding two pixels and are mutually low in the correlation.

Case C: There exists a high correlation among the image data of the four pixels.

Case D: There exists a high correlation between the image data of two pixels, and there exists a high correlation between the image data of the other two pixels.

FIG. 8 is a flowchart illustrating the procedure of selecting the compression methods in response to the correlation among the pixels.

First, if the following condition (A) is not established for any combination of i and j satisfying:

$$i \in \{A,B,C,D\},$$

$$j \in \{A,B,C,D\}, \text{ and}$$

$$i \neq j,$$

the compression circuit 11 determines case A is valid (that is, the correlation among the image data of the four pixels of arbitrary combinations of the four pixels is low) (step S01).

$$|Ri - Rj| \leq Th1,$$

$$|Gi - Gj| \leq Th1, \text{ and}$$

$$|Bi - Bj| \leq Th1. \hspace{2em} \text{Condition (A)}$$

When case A is valid, the compression circuit 11 determines that the (1×4) pixel compression is to be performed.

When determining that case A is not valid, the compression circuit 11 defines a first set of two pixels and a second set of two pixels for the four pixels, and determines for all the allowed first and second sets whether a condition that the difference of the image data between the two pixels of the first set is smaller than the predetermined value, and the difference of the image data between the two pixels of the second set is smaller than the predetermined value is satisfied (Step S02). More specifically, the compression circuit 11 determines whether any of the following conditions (B1) to (B3) holds true:

$$|R_A - R_B| \leq Th2,$$

$$|G_A - G_B| \leq Th2,$$

$|B_A-B_B| \leq Th2,$ $|R_C-R_D| \leq Th2,$ $|G_C-G_D| \leq Th2,$ and $|B_C-B_D| \leq Th2.$  Condition (B1)

$|R_A-R_C| \leq Th2,$ $|G_A-G_C| \leq Th2,$ $|B_A-B_C| \leq Th2,$ $|R_B-R_D| \leq Th2,$ $|G_B-G_D| \leq Th2,$ and $|B_B-B_D| \leq Th2.$  Condition (B2)

$|R_A-R_D| \leq Th2,$ $|G_A-G_D| \leq Th2,$ $|B_A-B_D| \leq Th2,$ $|R_D-R_C| \leq Th2,$ $|G_D-G_D| \leq Th2,$ and $|B_B-B_C| \leq Th2.$  Condition (B3)

When none of the above-described conditions (B1) to (B3) holds true, the compression circuit 11 determines that case B is valid (that is, there exists a high correlation between the image data of the two pixels, and the image data of the other two pixels are mutually low in the correlation). In this case, the compression circuit 11 determines that the (2+1×2) pixel compression is to be performed.

When determining that none of cases A and B is valid, the compression circuit 11 determines whether a condition that the difference between the maximum value and the minimum value of the image data of the four pixels with respect to all colors of the four pixels is smaller than a predetermined value is satisfied. More specifically, the compression circuit 11 determines whether the following condition (C) holds true (Step S03):

$\max(R_A,R_B,R_C,R_D)-\min(R_A,R_B,R_B,R_D)<Th3,$ $\max(G_A,G_B,G_C,G_D)-\min(G_A,G_B,G_C,G_D)<Th3,$ and $\max(B_A,B_B,B_C,B_D)-\min(B_A,B_B,B_C,B_D)<Th3.$  Condition (C)

When condition (C) does not hold true, the compression circuit 11 determines that case C is valid (that is, there exists a high correlation among the image data of the four pixels). In this case, the form recognition section 61 determines that the (4×1) pixel compression is to be performed.

When condition (C) does not hold true, on the other hand, the compression circuit 11 determines that case D is valid (that is, there exists a high correlation between image data of two pixels and there exists a high correlation between image data of the other two pixels). In this case, the compression circuit 11 determines that the (2×2) pixel compression is to be performed.

Based on the result of the above-described recognition of the correlation, the form recognition section 31 of the compression circuit 11 selects any of the (1×4) pixel compression, the (2+1×2) pixel compression, the (2×2) pixel compression, the (3+1) pixel compression, and the (4×1) pixel compression. As described later, the image data of the target block are compressed by using the selected compression method.

4. Details of Respective Compression Methods and Decompression Methods

Next, details of the compression methods and decompression methods are described for the (1×4) pixel compression, the (2+1×2) pixel compression, the (2×2) pixel compression and the (4×1) pixel compression, individually.

4-1. (1×4) Pixel Compression

FIGS. 9A and 9B are conceptual illustrations illustrating the formats of the (1×4) compressed data. As described above, the (1×4) pixel compression is a compression method used in the case that the correlation among the image data of the pixels is low for any combinations of the four pixels. Here, FIG. 9A illustrates the format of the compressed data in the case that the data compression ratio of 50% (=½) and FIG. 9B illustrates the format of the compressed data in the case that the data compression ratio of 66.7% (=⅔). Except that the total number of bits and the bit allocation are different, the basic format is common for these data compression ratios.

As illustrated in FIG. 9A, the (1×4) compressed data are comprised of: a header (attribute data) including a compression type recognition bit; $R_A$, $G_A$ and $B_A$ data corresponding to the image data of the pixel A; $R_B$, $G_B$ and $B_B$ data corresponding to the image data of the pixel B; $R_C$, $G_C$, and $B_C$ data corresponding to the image data of the pixel C; and $R_D$, $G_D$, and $B_D$ data corresponding to the image data of the pixel D. Here, the compression type recognition bit is data indicating the type of the compression method used for the compression processing, and one bit is allocated to the compression type recognition bit in the (1×4) compressed data. In the present embodiments, the value of the compression type recognition bit of the (1×4) compressed data is "0".

The $R_A$, $G_A$ and $B_A$ data are bit-plane reduced data obtained by performing reduction of the number of the bit planes for the grayscale values of the R, G and B subpixels of pixel A, and the $R_B$, $G_B$ and $B_B$ data are bit-plane reduced data obtained by performing reduction of the number of bit planes for the grayscale values of the R, G, and B subpixels of pixel B. Correspondingly, the $R_C$, $G_C$, and $B_C$ data are bit-plane reduced data obtained by performing reduction of the number of the bit planes for the grayscale values of the R, G, and B subpixels of pixel C, and the $R_D$, $G_D$, and $B_D$ data are bit-plane reduced data obtained by performing reduction of the number of the bit planes for the grayscale values of the R, G, and B subpixels of pixel D.

In the present embodiments, when the data compression ratio is 50% (FIG. 9A), only the $B_D$ data, which correspond to the B subpixel of pixel D, are three-bit data and other data are four-bit data. In such a bit allocation, the total number of bits including the compression type recognition bit is 48 bits. When the data compression ratio is 66.7% (FIG. 9B), on the other hand, the $G_A$, $G_B$ and $G_C$ data, which correspond to the G subpixels of pixels A, B and C, are six-bit data and other data are five-bit data. In such a bit allocation, the total number of bits including the compression type recognition bit is 64 bits.

FIG. 10A is a schematic illustration explaining the (1×4) pixel compression. Although FIG. 10A illustrates the (1×4) pixel compression for the data compression ratio of 50%, a similar compression processing is performed for the data compression ratio of 66.7%, except that the number of bits is different. In the (1×4) pixel compression, dithering using a dither matrix is performed for each of pixels A to D to thereby reduce the number of bit planes of the image data of pixels A to D. In detail, error data α is first added to each of the image data of pixel A, B, C, and D. In this embodiment, the error data α of each pixel is determined from the coordinates of the pixel of interest, by using a basic matrix which is a Bayer matrix. The calculation of the error data α will be described separately later. In the following, a description will be made assuming that the error data α defined for pixels A, B, C and D are 0, 5, 10, and 15, respectively.

Furthermore, rounding processing are performed to thereby generate the $R_A$, $G_A$ and $B_A$ data, the $R_B$, $G_B$ and $B_B$ data, the $R_C$, $G_C$ and $B_C$ data, and the $R_D$, $G_D$ and $B_D$ data. It should be noted that rounding processing means adding a value of $2^{(n-1)}$ and then truncating the lower n bits, where n is a desired value. When the data compression ratio is 50%, the grayscale value of the B subpixel of pixel D is subjected to a process of adding a value of 16 and then truncating the lower five bits, and the other grayscale values are subjected to a process of adding a value of 8 and then truncating the lower four bits. When the data compression ratio is 66.7%, on the other hand, the grayscale value of the G subpixels of pixels A, B and C are subjected to a process of adding a value of 2 and then truncating the lower two bits, and the other grayscale values are subjected to a process of adding a value of 4 and then truncating the lower three bits. The (1×4) compressed data are generated by attaching a value "0" as the compression type recognition bit to the $R_A$, $G_A$ and $B_A$ data, the $R_B$, $G_B$ and $B_B$ data, the $R_C$, $G_C$ and $B_C$ data, and the $R_D$, $G_D$ and $B_D$ data, which are generated in the above-described manner.

FIG. 10B is a diagram illustrating the decompression method for the (1×4) compressed data. Although FIG. 10B illustrates the decompression processing for the (1×4) compressed data for the data compression ratio of 50%, a similar decompression processing is performed for the data compression ratio of 66.7%, except that the number of bits is different.

In the decompression of the (1×4) compressed data, a left bit shift is first performed on the $R_A$, $G_A$ and $B_A$ data, the $R_B$, $G_B$, and $B_B$ data, the $R_C$, $G_C$, and $B_C$ data, and the $R_D$, $G_D$ and $B_D$ data. In detail, the number of bits of the left bit shift is the same as the number of bits which are truncated in the (1×4) pixel compression. That is, when the data compression ratio is 50%, the $B_D$ data associated with the B subpixel of pixel D are subjected to a 5-bit left bit shift, and the other data are subjected to a 4-bit left bit shift. When the data compression ratio is 66.7%, the grayscale values of the G subpixels of pixels A, B and C are subjected to a 2-bit left bit shift and the other grayscale values are subjected to a 3-bit left bit shift.

This is followed by subtracting the error data α to complete the decompression of the (1×4) compressed data. In this manner, (1×4) decompressed data which indicate the grayscale levels of the respective subpixels of pixels A to D are generated. The (1×4) decompressed data are data which are an approximate reproduction of the original image data. It would be understood that the original image data of pixels A to D are approximately reproduced by the above-described decompression method by comparing the image data of pixels A to D illustrated in FIG. 10B with the image data of pixels A to D illustrated in FIG. 10A.

4-2. (2+1×2) Pixel Compression

FIGS. 11A and 11B are conceptual illustrations illustrating the formats of the (2+1×2) compressed data. As described above, the (2+1×2) pixel compression is used in the case that there exists a high correlation between the image data of two pixels, while the image data of the other two pixels have a low correlation with the preceding two pixels and are mutually low in the correlation. Here, FIG. 11A illustrates the format of the compressed data in the case that the data compression ratio of 50% (=½) and FIG. 11B illustrates the format of the compressed data in the case that the data compression ratio of 66.7% (=⅔). Except that the total number of bits and the bit allocation are different, the basic format is common for these data compression ratios.

As illustrated in FIGS. 11A and 11B, in the present embodiments, the (2+1×2) compressed data are comprised of a header including compression type recognition bits; form recognition data, an R representative value, a G representative value, a B representative value, a large-small recognition data, a β comparison data, Ri, Gi and Bi data, and Rj, Gj and Bj data.

The compression type recognition bits are data indicative of the compression method used for the compression processing. In the (2+1×2) compressed data, two bits are allocated to the compression type recognition bits. In the present embodiments, the value of the compression type recognition bits of the (2+1×2) compressed data is "10".

The form recognition data are 3-bit data indicating which two pixels out of pixels A to D have a high correlation in the image data. When the (2+1×2) pixel compression is used, there exists a high correlation between the image data of two pixels and the remaining two pixels have a low correlation in the image data with the other pixels out of pixels A to D. Consequently, the number of allowed combinations of two pixels having a high correlation in the image data is six as follows:

Pixels A and C
Pixels B and D
Pixels A and B
Pixels C and D
Pixels B and C
Pixels A and D The form recognition data indicate with three bits which of these six combinations the two pixels having a high correlation in the image data belong to.

The R, G and B representative values are indicative of the grayscale values of the R subpixel, the G subpixel, and the B subpixel of the two pixels having the high correlation, respectively. When the data compression ratio is 50%, as illustrated in FIG. 11A, the R and G representative values are 5-bit or 6-bit data and the B representative value is 5-bit data. When the data compression ratio is 66.7%, on the other hand, as illustrated in FIG. 11B, the R, G and B representative values are each 7-bit or 8-bit data.

The β comparison data are indicative of whether or not the difference between the grayscale values of the subpixels of the same color of the two pixels having the high correlation are larger than a predetermined threshold value β. When the data compression ratio is 50%, the β comparison data are 2-bit data indicative of whether or not the difference between the grayscale values of the R subpixels of the two pixels having the high correlation and the difference between the image data of the G subpixels of the two pixels having the high correlation are larger than the predetermined threshold value β. When the data compression ratio is 66.7%, on the other hand, the β comparison data are 3-bit data indicative of whether or not the difference between the grayscale values of the R subpixels of the two pixels having the high correlation, the difference between the image data of the G subpixels of the two pixels having the high correlation and the difference between the image data of the B subpixels of the two pixels having the high correlation are larger than the predetermined threshold value β.

On the other hand, the large-small recognition data are data indicative of which of the subpixels of the same color of the two pixels having the high correlation has a larger grayscale value. When the data compression ratio is 50%, the large-small recognition data are data indicative of which R subpixel of the two pixels having the high correlation has a larger grayscale value and which G subpixel of the two pixels having the high correlation has a larger grayscale value. When the data compression ratio is 66.7%, the large-small recognition data are data indicative of which R subpixel of the two pixels having the high correlation has a larger grayscale value, which G subpixel of the two pixels having the high correlation has a larger grayscale value and which B subpixel of the two pixels having the high correlation has a larger grayscale value. The large-small recognition data corresponding to the R subpixels are generated only when the difference of the grayscale values of the R subpixels of the two pixels having the high correlation is larger than the threshold value β, the large-small recognition data corresponding to the G subpixels are generated only when the difference of the grayscale values of the G subpixels of the two pixels having the high correlation is larger than the threshold value β and the large-small recognition data corresponding to the B subpixels are generated only when the difference of the grayscale values of the B subpixels of the two pixels having the high correlation is larger than the threshold value β. Consequently, the large-small recognition data are data of zero to two bits in the case that the data compression ratio is 50% and data of zero to three bits in the case that data compression ratio is 66.7%.

The Ri, Gi and Bi data and the Rj, Gj and Bj data are bit-plane reduced data obtained by performing reduction of the bit planes for the grayscale values of the R, G and B subpixels of the two pixels having the low correlation. When the data compression ratio is 50%, all of the Ri, Gi, and Bi data and the Rj, Gj and Bj data are 4-bit data. When the data compression ratio is 66.7%, on the other hand, the Gi and Gj data are 6-bit data and Ri, Bi, Rj and Bj data are 5-bit data.

In the following, a description is given of (2+1×2) pixel compression with reference to FIG. 12A. FIG. 12A describes generation of the (2+1×2) compressed data in the case that the data compression ratio is 50%, the correlation between the image data of pixels A and B is high, the image data of pixels C and D has a low correlation with the image data of pixels A and B and the image data of pixels C and D have a low correlation with each other. It would be easily understood by the person skilled in the art that the (2+1×2) compressed data can be generated in a similar manner when the data compression ratio is 66.7% and when the combination of the pixels having a high correlation is different.

First, the compression processing of the image data of pixels A and B (which have a high correlation) is described. The average values of the grayscale values are first calculated for the R subpixels, G subpixels and B subpixels, respectively. The average values Rave, Gave, and Bave of the grayscale values of the R subpixels, the G subpixels, and the B subpixels are calculated by the following formula:

$$Rave=(R_A+R_3+1)/2,$$

$$Gave=(G_A+G_3/1)/2, \text{ and}$$

$$Bave=(B_A+B_B+1)/2.$$

Furthermore, a comparison is made as to whether or not the difference $|R_A-R_B|$ of the grayscale values of the R subpixels of pixels A and B and the difference $|G_A-G_B|$ of the grayscale values of the G subpixels are larger than the predetermined threshold value β. When the data compression ratio is 66.7%, a comparison is further made as to whether the difference $|B_A-B_B|$ of the grayscale values of the B subpixels of pixels A and B is larger than the predetermined threshold value β. The results of these comparisons are described in the (2+1×2) compressed data as the β comparison data.

Furthermore, the large-small recognition data are generated by the following procedure. When the difference $|R_A-R_B|$ of the grayscale values of the R subpixels of pixels A and B is larger than the threshold value β, the large-small recognition data are generated to describe which of the grayscale values of the R subpixels of pixels A and B is larger. If the difference $|R_A-R_B|$ of the grayscale values of the R subpixels of pixels A and B is not more than the threshold value β, the large-small recognition data are generated not to describe which of the grayscale values of the R subpixels of pixels A and B is larger. Similarly, when the difference $|G_A-G_B|$ of the grayscale values of the G subpixels of pixels A and B is larger than the threshold value β, the large-small recognition data are generated to describe which of the grayscale values of the G subpixels of pixels A and B is larger. If the difference $|G_A-G_B|$ of the grayscale values of the G subpixels of pixels A and B is not more than the threshold value β, the large-small recognition data are generated not to describe which of the grayscale values of the G subpixels of pixels A and B is larger. When the data compression ratio is 66.7% and the difference $|B_A-B_B|$ of the grayscale values of the B subpixels of pixels A and B is larger than the threshold value β, the large-small recognition data are generated to describe which of the grayscale values of the B subpixels of pixels A and B is larger. If the data compression ratio is 50% or if the difference $|B_A-B_B|$ of the grayscale values of the B subpixels of pixels A and B is not more than the threshold value β, the large-small recognition data are generated not to describe which of the grayscale values of the B subpixels of pixels A and B is larger.

In the example illustrated in FIG. 12A, the grayscale values of the R subpixels of pixels A and B are 50 and 59, respectively, and the threshold value β is 4, while the data compression ratio is 50%. In this case, since the grayscale value difference $|R_A-R_B|$ is larger than the threshold value β, this fact is described in the β comparison data, and the fact that the grayscale value of the R subpixel of pixel B is larger than the grayscale value of the R subpixel of pixel A is described in the large-small recognition data. On the other hand, the grayscale values of the G subpixels of pixels A and B are 2 and 1, respectively. Since the grayscale value difference $|G_A-G_B|$ is not more than the threshold value β, this fact is described in the β comparison data. The large-small recognition data are generated not to describe which of the grayscale values of the G subpixels of pixels A and B is larger. As a result, in the example of FIG. 12A, the large-small recognition data are 1-bit data.

Subsequently, error data α are added to the average values Rave, Gave and Bave of the grayscale values of the R, G and B subpixels. In the present embodiments, the error data α are determined from the coordinates of the two pixels of the relevant combination by using the basic matrix. The calculation of the error data α will be described later separately. In the following, a description is given assuming that the error data α defined for pixels A and B are 0 in the present embodiments.

Furthermore, the R, G and B representative values are calculated by performing rounding processing. The numerical values added in the rounding processing and the numbers of bits truncated in the bit truncation processing are determined in accordance with the relations of the grayscale value differences $|R_A-R_B|$, $|G_A-G_B|$ and $|B_A-B_B|$ with the threshold value β and the data compression ratio. First, a description is given for the case that the data compression ratio is 50%. In the case that the data compression ratio is 50%, when the grayscale value difference $|R_A-R_B|$ of the R subpixels is larger than the threshold value β, a process of truncating the lower three bits after adding a value of 5 to the average value Rave of the grayscale values of the R subpixels is performed to calculate the R representative value for the R subpixels. Otherwise, a process of truncating the lower two bits after adding a value of 2 to the average value Rave of the grayscale values of the R subpixels is performed to calculate the R representative value for the R subpixels. The similar goes for the G subpixels; when the grayscale value difference $|G_A-G_B|$ is larger than the threshold value β, a process of truncating the lower three bits after adding a value of 5 to the average value Gave of the grayscale values of the G subpixels is performed to calculate the G representative value. Otherwise, a process of truncating the lower two bits after adding a value of 2 to the average value Gave is performed to calculate the G representative value. In the example of FIG. 12A, a process of truncating the lower three bits after adding a value of 5 is performed for the average value Rave of the R subpixels and a process of truncating the lower two bits after adding a value of 2 for the average value Gave of the G subpixels. Finally, a process of truncating the lower three bits after adding a value of 5 to the average value Bave of the grayscale values of the B subpixels is performed to calculate the B representative value for the B subpixels.

In the case that the data compression ratio is 66.7%, on the other hand, when the grayscale value difference $|R_A-R_B|$ of the R subpixels is larger than the threshold value β, a process of truncating the lower one bit after adding a value of 2 to the average value Rave of the grayscale values of the R subpixels is performed to calculate the R representative value for the R subpixels. Otherwise, the average value Rave is calculated as the R representative value as it is. The similar goes for the G subpixels and the B subpixels. When the grayscale value difference $|G_A-G_B|$ is larger than the threshold value β, a process of truncating the lower one bit after adding a value of 2 to the average value Gave of the grayscale values of the G subpixels is performed to calculate the G representative value. Otherwise, the average value Gave is calculated as the G representative value as it is. Furthermore, when the grayscale value difference $|B_A-B_B|$ is larger than the threshold value β, a process of truncating the lower one bit after adding a value of 2 to the average value Bave of the grayscale values of the B subpixels is performed to calculate the B representative value. Otherwise, the average value Bave is calculated as the B representative value as it is. The above-described procedure completes the compression processing for pixels A and B.

With respect to the image data of the pixels C and D (which have the low correlation), on the other hand, the same processing as the (1×4) pixel compression is performed. That is, the dithering processing using a dither matrix is independently performed with respect to each of pixels C and D, thereby reducing the number of bit planes of the image data of pixels C and D. In detail, the error data α are first added to each of the image data of pixels C and D. As described above, the error data α of each pixel is calculated from the coordinates of the pixel of interest. In the following, a description will be made assuming that the error data α defined for pixels C and D are 10 and 15, respectively.

Furthermore, rounding processing is performed to generate the $R_C$, $G_C$ and $B_C$ data, and the $R_D$, $G_D$ and $B_D$ data. In detail, when the data compression ratio is 50%, a process of truncating lower four bits after adding a value of 8 to each of the grayscale values of the R, G and B subpixels of each of pixels C and D is performed to calculate the $R_C$, $G_C$, and $B_C$ data, and the $R_D$, $G_D$ and $B_D$ data. When the data compression ratio is 66.7%, on the other hand, a process of truncating lower three bits after adding a value of 4 to each of the grayscale values of the R and B subpixels of each of pixels C and D is performed. The $R_C$ and $B_C$ data and the $R_D$ and $B_D$ data are thus calculated. Furthermore, a process of truncating lower two bits after adding a value of 2 to each of the grayscale values of the G subpixels of each of pixels C and D is performed. The $G_C$ data and the $G_D$ data are thus calculated.

The (2+1×2) compressed data are generated by attaching the compression type recognition bits and the form recognition data to the R, G and B representative values, the large-small recognition data, the β comparison data, the $R_C$, $G_C$ and $B_C$ data, and the $R_D$, $G_D$ and $B_D$ data, which are generated as described above.

Figure 12B:
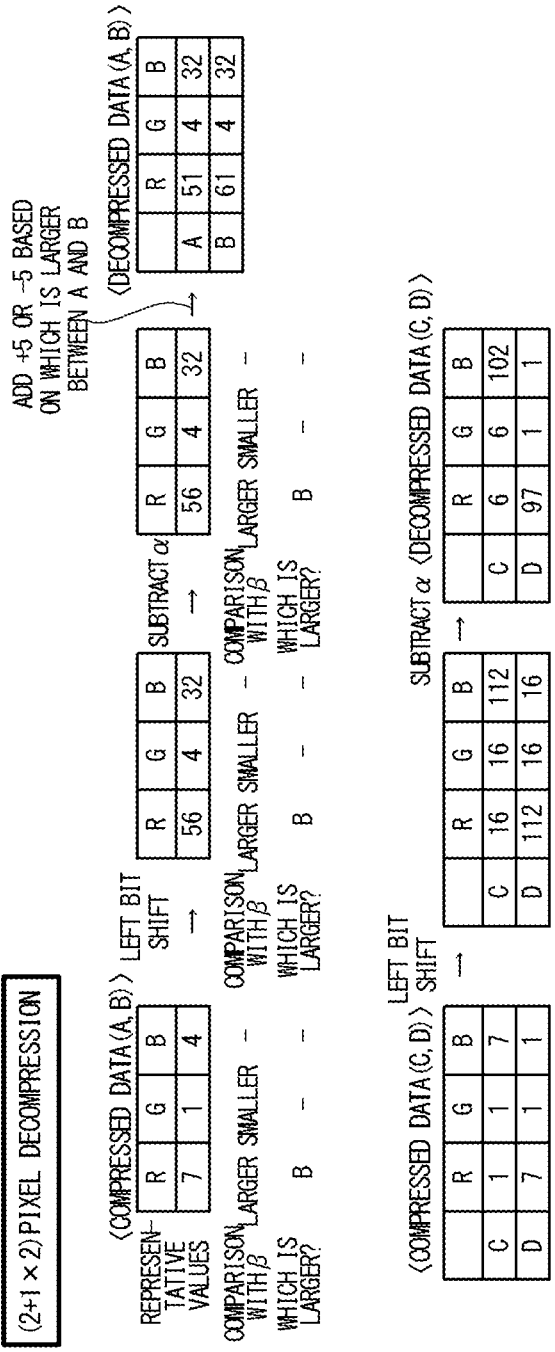
FIG. 12B is a conceptual illustration illustrating the contents of decompression processing of (2+1×2) compressed data.

FIG. 12B is, on the other hand, a diagram illustrating the decompression method of the (2+1×2) compressed data. FIG. 12B shows the decompression of the (2+1×2) compressed data in the case that the data compression ratio is 50%, the correlation between the image data of pixels A and B is high, the image data of pixels C and D have a low correlation with the image data of pixels A and B, and the correlation of the image data between pixels C and D is low each other. It would be easily understood by the person skilled in the art that the (2+1×2) compressed data can be decompressed in a similar manner when the data compression ratio is 66.7% and when the correlation of the pixels is different.

In the decompression processing of the (2+1×2) compressed data, left bit shifts are first performed for the R, G and B representative values. It should be noted, however, that whether or not each left bit shift is to be performed is determined based on the relations between the grayscale level differences $|R_A-R_B|$, $|G_A-G_B|$ and $|B_A-B_B|$ and the threshold value β, which are described in the β comparison data, and based on the data compression ratio. A description is first given on the left bit shift in the case that the data compression ratio is 50%. When the grayscale value difference $|R_A-R_B|$ of the R subpixels is larger than the threshold value β, a 3-bit left bit shift is performed for the R representative value; otherwise, a 2-bit left bit shift is performed. Correspondingly, when the grayscale value difference $|G_A-G_B|$ of the G subpixels is larger than the threshold value β, a 3-bit left bit shift is performed for the G representative value; otherwise, a 2-bit left bit shift is performed. In the example of FIG. 12B, a 3-bit left bit shift is performed for the R representative value, and a 2-bit left bit shift is performed for the G representative value. On the other hand, a 3-bit left bit shift is performed for the B representative value independently of the β comparison data.

In the case that the data compression ratio is 66.7%, on the other hand, when the grayscale value difference $|R_A-R_B|$ of the R subpixels is larger than the threshold value β, a 1-bit left bit shift is performed for the R representative value; otherwise, no left bit shift is performed for the R representative value. Correspondingly, when the grayscale value difference $|G_A-G_B|$ of the G subpixels is larger than the threshold value β, a 1-bit left bit shift is performed for the G representative value; otherwise, no left bit shift is performed for the G representative value. Furthermore, when the grayscale value difference $|B_A-B_B|$ of the B subpixels is larger than the threshold value β, a 1-bit left bit shift is performed for the B representative value; otherwise, no left bit shift is performed for the B representative value.

After the left bit shift processing described above is completed, the error data α are subtracted from the R, G and B representative values, respectively, and the grayscale values of the R, G and B subpixels of pixels A and B are then reproduced from the R, G and B representative values of the (2+1×2) decompressed data.

In the reproduction of the grayscale values of the R subpixels of pixels A and B of the (2+1×2) decompressed data, the β comparison data and the large-small recognition data are used. When the β comparison data describe that the difference $|R_A-R_B|$ of the grayscale values of the R subpixels is larger than the threshold value β, a value obtained by adding a constant value of 5 to the R representative value is reproduced as the grayscale value of the R subpixel which is described as being larger between pixels A and B in the large-small recognition data, and a value obtained by subtracting a constant value of 5 from the R representative value is reproduced as the grayscale value of the R subpixel which is described as being smaller in the large-small recognition data. On the other hand, when the difference $|R_A-R_B|$ of the grayscale values of the R subpixels is smaller than the threshold value β, grayscale values of the R subpixels of pixels A and B are reproduced as being identical to the R representative value. In the example of FIG. 12B, the grayscale value of the R subpixel of pixel A is reproduced as the value obtained by subtracting a value of 5 from the R representative value, and the grayscale value of the R subpixel of pixel B is reproduced as the value obtained by adding a value of 5 to the R representative value. Similar processing is performed by using the β comparison data and the large-small recognition data for the reproduction of the grayscale values of the G subpixels of pixels A and B. In the example of FIG. 12B, the values of the G subpixels of pixels A and B are both reproduced as being identical to the G representative value.

When the data compression ratio is 66.7%, similar processing is also performed by using the β comparison data and the large-small recognition data in the reproduction of the grayscale values of the B subpixels of pixels A and B. When the data compression ratio is 50%, on the other hand, the values of the B subpixels of pixels A and B are reproduced as being identical to the B representative value, irrespective of the β comparison data and the large-small recognition data; the β comparison data and the large-small recognition data do not exist for the B subpixels of pixels A and B.

The above-described procedure completes the reproduction of the grayscale values of the R subpixels, the G subpixels, and the B subpixels of pixels A and B.

In the decompression processing regarding the image data of pixels C and D (having a low correlation), on the other hand, processing similar to the above-described decompression processing for the (1×4) compressed data is performed. When the data compression ratio is 50%, a 4-bit left bit shift is first performed for each of the $R_C$, $G_C$ and $B_C$ data, and the $R_D$, $G_D$, and $B_D$ data in the decompression processing regarding the image data of pixels C and D. The subtraction of error data α is then performed, and as a result, the grayscale values of the R subpixels, the G subpixels and the B subpixels of pixels C and D are reproduced. When the data compression ratio is 66.7%, a 3-bit left bit shift is first performed for each of the $R_C$ and $B_C$ data and the $R_D$ and $B_D$ data and a 2-bit left bit shift is performed for each of the $G_C$ and $G_D$ data. The subtraction of error data α is then performed, and as a result, the grayscale values of the R subpixels, the G subpixels and the B subpixels of pixels C and D are reproduced.

The above-described procedure completes the reproduction of the grayscale values of the R subpixels, the G subpixels, and the B subpixels of pixels C and D. The grayscale values of the R subpixels, the C subpixels, and the B subpixels of pixels C and D are reproduced as 8-bit values.

4-3. (2×2) Pixel Compression

FIGS. 13A and 13B are conceptual illustrations illustrating the format of the (2×2) compressed data. As described above, the (2×2) pixel compression is used in the case that there exists a high correlation between the image data of the two pixels, and there exists a high correlation between the image data of the other two pixels. Here, FIG. 13A illustrates the format of the compressed data in the case that the data compression ratio of 50% (=1/2) and FIG. 13B illustrates the format of the compressed data in the case that the data compression ratio of 66.7% (=2/3). Except that the total number of bits and the bit allocation are different, the basic format is common for these data compression ratios.

In the present embodiments, (2×2) compressed data are composed of: compression type recognition bits, form recognition data, a R representative value #1, a G representative value #1, a B representative value #1, an R representative value #2, a G representative value #2, a B representative value #2, a large-small recognition data, and β comparison data.

The compression type recognition bits are data indicating the compression method used for the compression processing, and three bits are allocated to the compression type recognition bits in the (2×2) compressed data. In the present embodiments, the value of the compression type recognition bits of the (2×2) compressed data is "110".

The form recognition data are two-bit data indicating which two pixels out of pixels A to D have a high correlation in the image data. When the (2×2) pixel compression is used, there exists a high correlation between the image data of two pixels out of out of pixels A to D, and there exists a high correlation between the image data of the other two pixels. Consequently, the allowed combinations of two pixels having a high correlation in the image data are the following three combinations:

There exists a high correlation between pixels A and B, and there exists a high correlation between pixels C and D.

There exists a high correlation between pixels A and C, and there exists a high correlation between pixels B and D.

There exists a high correlation between pixels A and D, and there exists a high correlation between pixels B and C.
The form recognition data indicate by two bits which combination is the case out of these three combinations.

The R representative value #1, the G representative value #1, and the B representative value #1 represent the grayscale values of the R subpixels, the G subpixels, and the B subpixels of one set of two pixels, respectively, and the R representative value #2, the G representative value #2, and the B representative value #2 represent the grayscale values of the R subpixels, the G subpixels, and the B subpixels of the other set of two pixels, respectively. As shown in FIG. 13A, when the data compression ratio is 50%, the R representative value #1, G representative value #1, the B representative value #1, the R representative value #2, and the B representative value #2 are 5-bit or 6-bit data, and the G representative value #2 are 6-bit or 7-bit data. When the data compression ratio is 66.7%, on the other hand, as shown in FIG. 13B, the R representative value #1, G representative value #1, the B representative value #1, the R representative value #2, and the G representative value #2 are 8-bit or 9-bit data, and the B representative value #2 are 7-bit or 8-bit data.

The β comparison data indicate whether the difference of the grayscale values of the R subpixels of two pixels having a high correlation, the difference of the image data of the G subpixels of the two pixels having a high correlation, and the difference of the image data of the B subpixels of the two pixels are larger than the predetermined threshold value β. In the present embodiments, the β comparison data of the (2×2) compressed data are 6-bit data in which three bits are allocated to each of the two pairs of pixels. On the other hand, the large-small recognition data indicate which of the R subpixels of the two pixels having a high correlation has a larger grayscale value, which of the G subpixels of the two pixels having a high correlation has a larger grayscale value, and which of the B subpixels of the two pixels having a high correlation has a larger grayscale value. The large-small recognition data associated with the R subpixels are generated only when the difference of the grayscale values of the R subpixels of the two pixels having a high correlation is larger than the threshold value β, the large-small recognition data associated with the G subpixels are generated only when the difference of the grayscale values of the G subpixels of the two pixels having a high correlation is larger than the threshold value β, the large-small recognition data associated with the B subpixels are generated only when the difference of the grayscale values of the B subpixels of the two pixels having a high correlation is larger than the threshold value β. Accordingly, the large-small recognition data of the (2×2) compressed data are 0- to 6-bit data.

In the following, a description is given of the (2×2) pixel compression with reference to FIG. 14A. FIG. 14A describes generation of the (2×2) compressed data in the case that the data compression ratio is 50%, the correlation between the image data of pixels A and B is high and the correlation between the image data of pixels C and D is high. It would be easily understood by the person skilled in the art that the (2×2) compressed data can be generated in a similar manner when the data compression ratio is 66.7% and when the correlation among the pixels is different.

First, the average values of the grayscale values are calculated with respect to the R subpixels, the G subpixels, and the B subpixels, respectively. The average values Rave1, Gave1, and Bave1 of the grayscale values of the R subpixels, G subpixels, and the B subpixels of pixels A and B, and the average values Rave2, Gave2, and Bave2 of the grayscale values of the R subpixels, G subpixels, and the B subpixels of pixels C and D are calculated by the following formula:

$$Rave1=(R_A+R_B1)/2,$$

$$Gave1=(G_A+G_B+1)/2,$$

$$Bave1=(B_A+B_B+1)/2,$$

$$Rave2=(R_A+R_B+1)/2,$$

$$Gave2=(G_A+G_B+1)/2,$$

$$Bave1=(B_A+B_B+1)/2.$$

Furthermore, comparisons are made as to whether the difference $|R_A-R_B|$ of the grayscale values of the R subpixels of pixels A and B, the difference $|G_A-G_B|$ of the grayscale values of the G subpixels, and the difference $|B_A-B_B|$ of the grayscale values of the B subpixels are larger than the predetermined threshold value β. Similarly, comparisons are made as to whether the difference $|R_C-R_D|$ of the grayscale values of the R subpixels of pixels C and D, the difference $|G_C-G_D|$ of the grayscale values of the G subpixels, and the difference $|B_C-B_D|$ of the grayscale values of the B subpixels are larger than the predetermined threshold value β. The results of these comparisons are described in the (2×2) compressed data as the β comparison data.

Furthermore, the large-small recognition data are generated for the combination of pixels A and B and the combination of pixels C and D, respectively.

In detail, the large-small recognition data are generated to describe which of the R subpixels of pixels A and B has a larger grayscale value, when the difference $|R_A-R_B|$ of the grayscale values of the R subpixels of pixels A and B is larger than the threshold value β. When the difference $|R_A-R_B|$ of the grayscale values of the R subpixels of pixels A and B is not more than the threshold value β, the relation of the grayscale values of the R subpixels of pixels A and B is not described in the large-small recognition data. Similarly, the large-small recognition data are generated to describe which of the G subpixels of pixels A and B has a larger grayscale value, when the difference $|G_A-G_B|$ of the grayscale values of the G subpixels of pixels A and B is larger than the threshold value β. When the difference $|G_A-G_B|$ of the grayscale values of the G subpixels of pixels A and B is not more than the threshold value β, the relation of the grayscale values of the G subpixels of pixels A and B is not described in the large-small recognition data. In addition, the large-small recognition data are generated to describe which of the B subpixels of pixels A and B has a larger grayscale value β, when the difference $|B_A-B_B|$ of the grayscale values of the B subpixels of pixels A and B is larger than the threshold value β. When the difference $|B_A-B_B|$ of the grayscale values of the B subpixels of pixels A and B is not more than the threshold value β, the relation of the grayscale values of the B subpixels of pixels A and B is not described in the large-small recognition data.

Similarly, the large-small recognition data are generated to describe which of the R subpixels of pixels C and D has a larger grayscale value, when the difference $|R_C-R_D|$ of the grayscale values of the R subpixels of pixels C and D is larger than the threshold value β. When the difference $|R_C-R_D|$ of the grayscale values of the R subpixels of pixels C and D is not more than the threshold value β, the relation of the grayscale values of the R subpixels of pixels C and D is not described in the large-small recognition data. Similarly, the large-small recognition data are generated to describe which of the G subpixels of pixels C and D has a larger grayscale value, when the difference $|G_C-G_D|$ of the grayscale values of the G subpixels of the pixels C and D is larger than the threshold value β. When the difference $|G_C-G_D|$ of the grayscale values of the G subpixels of pixels C and D is not more than the threshold value β, the relation of the grayscale values of the G subpixels of pixels C and D is not described in the large-small recognition data. In addition, the large-small recognition data are generated to describe which of the B subpixels of pixels C and D has a larger grayscale value, when the difference $|B_C-B_D|$ of the grayscale values of the B subpixels of pixels C and D is larger than the threshold value β. When the difference $|B_C-B_D|$ of the grayscale values of the B subpixels of pixels C and D is not more than the threshold value β, the relation of the grayscale values of the B subpixels of the pixels C and D is not described in the large-small recognition data.

In the example of FIG. 14A, the grayscale values of the R subpixels of pixels A and B are 50 and 59, and the threshold values β thereof are 4, respectively. In this case, since the grayscale value difference $|R_A-R_B|$ is larger than the threshold value β, this fact is described in the β comparison data, and the fact that the grayscale value of the R subpixel of pixel B is larger than the grayscale value of the R subpixel of pixel A is described in the large-small recognition data. On the other hand, the grayscale values of the G subpixels of pixels A and B are 2 and 1, respectively. In this case, since the grayscale value difference $|G_A-G_B|$ is not more than the threshold value β, fact is described in the β comparison data. The relation of the grayscale values of the G subpixels of pixels A and B is not described in the large-small recognition data. Furthermore, the grayscale values of the B subpixels of pixels A and B are 30 and 39, respectively. In this case, since the grayscale value $|B_A-B_B|$ is larger than the threshold value β, this fact is described in the β comparison data, and the fact that the grayscale value of the B subpixel of pixel B is larger than the grayscale value of the B subpixel of pixel A is described in the large-small recognition data.

Furthermore, the grayscale values of the R subpixels of pixels C and D are 100, respectively. In this case, since the grayscale value difference $|R_C-R_D|$ is not more than the threshold value β, this fact is described in the β comparison data. The relation of the grayscale values of the G subpixels of pixels C and D is not described in the large-small recognition data. Furthermore, the grayscale values of the G subpixels of pixels C and D are 80 and 85, respectively. In this case, since the grayscale value difference $|G_A-G_B|$ is larger than the threshold value β, this fact is described in the β comparison data. Furthermore, the fact that the grayscale value of the G subpixel of pixel D is larger than the grayscale value of the G subpixel of pixel C is described in the large-small recognition data. Besides, the grayscale values of the B subpixels of pixels C and D are 8 and 2, respectively. In this case, since the grayscale value difference $|B_C-B_D|$ is larger than the threshold value β, this fact is described in the β comparison data. Furthermore, the fact that the grayscale value of the B subpixel of pixel C is larger than the grayscale value of the B subpixel of pixel D is described in the large-small recognition data.

Furthermore, error data α are added to the average values Rave1, Gave1, and Bave1 of the grayscale values of the R subpixels, the G subpixels, and the B subpixels of pixels A and B, and the average values Rave2, Gave2, and Bave2 of the grayscale values of the R subpixels, the C subpixels, and the B subpixels of pixels C and D. In the present embodiments, the error data α are determined by using a basic matrix which is a Bayer matrix from the coordinates of the two pixels of each combination. The calculation of the error data α will be described separately later. In the following, a description is given below assuming that the error data α defined for pixels A and B are 0 in the present embodiments.

This is followed by rounding and bit truncation processing to thereby calculate the R representative value #1, the G representative value #1, the B representative value #1, the R representative value #2, the G representative value #2, and the B representative value #2. The rounding and bit truncation processing are dependent on the data compression ratio. A description is first given of the case that the data compression ratio is 50%. When the data compression ratio is 50%, the numerical value to be added and the number of bits to be truncated in the rounding and bit truncation processing for pixels A and B are determined to be two or three bits in accordance with the relation between the grayscale value differences $|R_A-R_B|$, $|G_A-G_B|$, and $|B_A-B_B|$ and the threshold value β. With respect to the R subpixels, the R representative value #1 is calculated by truncating the lower three bits after adding a value of 4 to the average value Rave1 of the grayscale values of the R subpixels, when the difference $|R_A-R_B|$ of the grayscale values of the R subpixels is larger than the threshold value β. Otherwise, the R representative value #1 is calculated by truncating the lower two bits after adding a value of 2 to the average value Rave1. As a result, the R representative value #1 is calculated as 5-bit or 6-bit data. The same goes for the G subpixels and the B subpixels. The G representative value #1 is calculated by truncating lower three bits after adding a value of 4 to the average value Gave1 of the grayscale values of the G subpixels, when the grayscale value difference $|G_A-G_B|$ is larger than the threshold value β. Otherwise, the G representative value #1 is calculated by truncating the lower two bits after adding a value of 2 to the average value Gave1. Furthermore, the B representative value #1 is calculated by truncating the lower three bits after adding a value of 4 to the average value Bave1 of the grayscale values of the B subpixels, when the grayscale value difference $|B_A-B_B|$ is larger than the threshold value β. Otherwise, the B representative value #1 is calculated by truncating the lower two bits after adding a value of 2 to the average value Bave1.

When the data compression ratio is 66.7%, on the other hand, rounding and bit truncation processing are not performed for any of the R subpixels, the G subpixels and the B subpixels of pixels A and B. The average values Rave1, Gave1, and Bave1 of the grayscale values of the R subpixels, G subpixels, and the B subpixels are calculated and used as the R representative value #1, the G representative value #1 and the B representative value #1, respectively, as they are.

In the example of FIG. 14A, in which the data compression ratio is determined as 50%, the R representative value #1 is calculated by truncating the lower three bits after adding a value of 4 to the average value Rave1 of the R subpixels of pixels A and B. Furthermore, the G representative value #1 is calculated by truncating the lower two bits after adding a value of 2 to the average value Gave1 of the G subpixels of pixels A and B. Furthermore, the B representative value #1 is calculated by truncating the lower three bits after adding a value of 4 to the average value Bave1 of the grayscale values of the B subpixels of pixels A and B.

The same processing is also performed for the combination of pixels C and D to calculate the R representative value #2, the G representative value #2 and the B representative value #2. It should be noted, however, that, with respect to the G subpixels of pixels C and D in the case that the data compression ratio is 50%, the numerical value added in the rounding processing and the number of bits truncated in the bit truncation processing are one bit or two bits. When the difference $|G_C-G_D|$ of the grayscale values is larger than the threshold value β, the G representative value #2 is calculated by truncating the lower two bits after adding a value of 2 to the average value Gave2 of the grayscale values of the G subpixels. Otherwise, the G representative value #2 is calculated by truncating the lower one bit after adding a value of 1 to the average value Gave2.

In the example of FIG. 14A, in which the data compression ratio is 50%, the R representative value #2 is calculated by truncating the lower two bits after adding a value of 2 to the average value Rave 2 of the R subpixels of pixels C and D. Furthermore, the G representative value #2 is calculated by truncating the lower three bits after adding a value of 4 to the average value Gave2 of the G subpixels of pixels C and D. Furthermore, with respect to the B subpixels of pixels C and D, the B representative value #2 is calculated by truncating the lower three bits after adding a value of 4 to the average value Bave2 of the grayscale values of the B subpixels.

The above-described procedure completes the compression processing by the (2×2) pixel compression.

FIG. 14B is, on the other hand, a diagram illustrating the decompression method of the compressed image data generated by the (2×2) pixel compression. FIG. 14B describes the decompression of the (2×2) compressed data in the case that the data compression ratio is 50%, the correlation between the image data of pixels A and B is high, and the correlation of the image data between pixels C and D is high. It would be easily understood by the person skilled in the art that the (2×2) compressed data can be decompressed in a similar manner when the data compression ratio is 66.7% and when the correlation of the pixels is different.

First, left bit shifts are performed for the R representative value #1, the G representative value #1, and the B representative value #1. The number of bits of the left bit shift processing is determined in accordance with the relation of the grayscale value differences $|R_A-R_B|$, $|G_A-G_B|$, and $|B_A-B_B|$ with the threshold value $\beta$ described in the $\beta$ comparison data and the data compression ratio. A description is given first of the case that the data compression ratio is 50%. In the case that the data compression ratio is 50%, when the difference $|R_A-R_B|$ of the grayscale values of the R subpixels of pixels A and B is larger than the threshold value $\beta$, a 3-bit left bit shift is performed for the R representative value #1; otherwise, a 2-bit left bit shift is performed. Similarly, when the difference $|G_A-G_B|$ of the grayscale values of the G subpixels of pixels A and B is larger than the threshold value $\beta$, a 3-bit left bit shift is performed for the G representative value #1; otherwise, a 2-bit left bit shift is performed. Furthermore, when the difference $|B_A-B_B|$ of the grayscale values of the B subpixels of pixels A and B is larger than the threshold value $\beta$, a 3-bit left bit shift is performed for the B representative value #1; otherwise, a 2-bit left bit shift is performed. In the example of FIG. 14B, a 3-bit left bit shift is performed for the R representative value #1, a 2-bit left bit shift is performed for the G representative value #1, and a 3-bit left bit shift is performed for the B representative value #1. In the case that the data compression ratio is 66.7%, on the other hand, no left bit shift is performed.

Similar left bit shifts are performed also for the R representative value #2, the G representative value #2, and the B representative value #2. It should be noted, however, that the number of bits of the left bit shift processing of the G representative value #2 is selected from one bit or two bits in the case that the data compression ratio is 50%. When the difference $|G_C-G_D|$ of the grayscale values of the G subpixels of pixels C and D is larger than the threshold value $\beta$, a 2-bit left bit shift is performed for the G representative value #2; otherwise, a 1-bit left bit shift is performed. In the example of FIG. 14B, a 2-bit left bit shift is performed for the R representative value #2, a 2-bit left bit shift is performed for the G representative value #2, and a 3-bit left bit shift is performed for the B representative value #2.

Furthermore, after subtracting the error data $\alpha$ from each of the R representative value #1, the G representative value #1, the B representative value #1, the R representative value #2, the G representative value #2, and the B representative value #2, the grayscale values of the R, G, and B subpixels of pixels A and B and the grayscale values of the R, G and B subpixels of pixels C and D are reproduced from the R representative value #1, the G representative value #1, the B representative value #1, the R representative value #2, the G representative value #2, and the B representative value #2.

In the reproduction of the grayscale values, the comparison data and the large-small recognition data are used. When the fact that the difference $|R_A-R_B|$ of the grayscale values of the R subpixels of pixels A and B is larger than the threshold value $\beta$ described in the $\beta$ comparison data, a value obtained by adding a constant value of 5 to the R representative value #1 is reproduced as the grayscale value of the R subpixel which is described in the large-small recognition data as having a larger grayscale value out of the R subpixels of pixels A and B, and a value obtained by subtracting a constant value of 5 from the R representative value #1 is reproduced as the grayscale value of the R subpixel which is described in the large-small recognition data as having a smaller grayscale value. When the difference $|R_A-R_B|$ of the grayscale values of the R subpixels of pixels A and B is smaller than the threshold value $\beta$, the grayscale values of the R subpixels of pixels A and B are reproduced as being identical to the R representative value #1. Similarly, the grayscale values of the G subpixels and the B subpixels of pixels A and B, and the grayscale values of the R subpixels, the G subpixels, and the B subpixels of pixels C and D are also reproduced by the same procedure.

In the example of FIG. 14B, the grayscale value of the R subpixel of pixel A is reproduced as the value obtained by subtracting a value of 5 from the R representative value #1, and the grayscale value of the R subpixel of pixel B is reproduced as the value obtained by adding a value of 5 from the R representative value #1. Furthermore, the grayscale values of the G subpixels of pixels A and B are reproduced as being identical to the G representative value #1. Furthermore, the grayscale value of the B subpixel of pixel A is reproduced as the value obtained by subtracting a value of 5 from the B representative value #1, and the grayscale value of the B subpixel of pixel B is reproduced as the value obtained by adding a value of 5 from the B representative value #1. On the other hand, the grayscale values of the R subpixels of pixels C and D are reproduced as being identical to the R representative value #2. Furthermore, the grayscale value of the G subpixel of pixel C is reproduced as the value obtained by subtracting a value of 5 from the G representative value #2, and the grayscale value of the G subpixel of the pixel D is reproduced as the value obtained by adding a value of 5 to the G representative value #2. Furthermore, the grayscale value of the B subpixel of pixel C is reproduced as the value obtained by adding a value of 5 to the G representative value #2, and the grayscale value of the B subpixel of the pixel D is reproduced as the value obtained by subtracting a value of 5 from the G representative value #2.

The above-described procedure completes the reproduction of the grayscale values of the R subpixels, the G subpixels, and the B subpixels of pixels A to D. It would be understood from comparison of the image data of pixels A to D in the right column of FIG. 14B with the image data of pixels A to D in the left column of FIG. 14A that the original image data of pixels A to D are approximately reproduced by the above-described decompression method.

4-4. (4×1) Pixel Compression

FIGS. 15A and 15B are conceptual illustrations illustrating the format of the (4×1) compressed data. As described above, the (4×1) pixel compression is used in the case that there exists a high correlation among the image data of the four pixels of the target block. Here, FIG. 15A illustrates the format of the compressed data in the case that the data compression ratio of 50% (=1/2) and FIG. 15B illustrates the format of the compressed data in the case that the data compression ratio of 66.7% (=2/3). Except that the total number of bits and the bit allocation are different, the basic format is common for these data compression ratios.

As shown in FIGS. 15A and 15B, in the present embodiments, the (4×1) compressed data include compression type recognition bits and the following seven data: Ymin, Ydist0 to Ydist2, address data, Cb' and Cr', and when the data compression ratio is 66.7%, further includes a 1-bit pudding data.

The compression type recognition bits are data indicating the compression method used for the compression processing, and four bits are allocated to the compression type recognition bits in the present embodiments.

Ymin, Ydist0 to Ydist2, the address data, Cb' and Cr' are obtained by converting the image data of the four pixels of the target block into YUV data from RGB data, and performing compression processing on the YUV data. Here, Ymin and Ydist to Ydist2 are obtained from the brightness data of the YUV data of four pixels of the target block, and Cb' and Cr' are obtained from the color difference data. Ymin, Ydist0 to Ydist2, Cb' and Cr' are the representative values of the image data of the four pixels of the target block. When the data compression ratio is 50%, as shown in FIG. 15A, 10 bits are allocated to Ymin, four bits are allocated to each of Ydist0 to Ydist2, two bits are allocated to the address data, and 10 bits are allocated to each of Cb' and Cr'. When the data compression ratio is 66.7%, on the other hand, as shown in FIG. 15B, 12 bits are allocated to Ymin, seven bits are allocated to each of Ydist0 to Ydist2, two bits are allocated to the address data, 12 bits are allocated to each of Cb' and Cr', and one bit is allocated to the pudding data. The pudding data is data used for adjusting the number of bits of the compressed data.

In the following, a description is given of (4×1) pixel compression with reference to FIG. 16A. First, the brightness data Y and the color difference data Cr and Cb are calculated by the following matrix calculation with respect to each of pixels A to D:

$$\begin{bmatrix} Y_k \\ Cr_k \\ Cb_k \end{bmatrix} = \begin{bmatrix} 1 & 2 & 1 \\ 0 & -1 & 1 \\ 1 & -1 & 0 \end{bmatrix} \begin{bmatrix} R_k \\ G_k \\ B_k \end{bmatrix},$$

where $Y_k$ is the brightness data of the pixel k, and $Cr_k$ and $Cb_k$ are the color difference data of the pixel k. $R_k$, $G_k$ and $B_k$ are the grayscale values of the R subpixel, the G subpixel, and the B subpixel of pixel k, respectively, as described above.

Further, Ymin, Ydist0 to Ydist2, the address data, Cb' and Cr' are generated from the brightness data $Y_k$, the color difference data $Cr_k$ and $Cb_k$, of pixels A to D.

Ymin is defined as the minimum value of the brightness data $Y_A$ to $Y_D$ (minimum brightness data). Further, Ydist0 to Ydist2 are generated by performing truncating two bits of the difference between the other brightness data and the minimum brightness data Ymin. The address data are generated as data indicating which has the minimum value among the brightness data of pixels A to D. In the example of FIG. 16A, Ymin and the Ydist0 to Ydist2 are calculated by the following formula:

$Y\text{min}=Y_D=4,$ $Y\text{dist0}=(Y_A-Y\text{min})>>2=(48-4)>>2=11,$ $Y\text{dist1}=(Y_B-Y\text{min})>>2=(28-4)>>2=6,\text{ and}$ $Y\text{dist2}=(Y_C-Y\text{min})>>2=(16-4)>>2=3,$ where ">>2" is an operator indicative of 2-bit truncation. The fact that the brightness data $Y_D$ have the minimum value is described in the address data.

Further, Cr' is generated by 1-bit truncation from the sum of the $Cr_A$ to $Cr_D$. Similarly, Cb' is generated by 1-bit truncation from the sum of $Cb_A$ to $Cb_D$. In the example of FIG. 16A, Cr' and Cb' are calculated by the following formula:

$$Cr' = (Cr_A + Cr_B + Cr_C + Cr_D) >> 1,$$
$$= (2+1-1+1) >> 1 = 1,$$
$$Cb' = (Cb_A + Cb_B + Cb_C + Cb_D) >> 1, \text{ and}$$
$$= (-2-1+1-1) >> 1 = -1,$$

where ">>1" is an operator indicating 1-bit truncation. The above-described procedure completes the generation of the (4×1) compressed data.

On the other hand, FIG. 16B is a diagram illustrating a method of generating (4×1) decompressed data by decompressing the (4×1) compressed data. In the decompression of the (4×1) compressed data, the brightness data of each of pixels A to D are first reproduced from Ymin and Ydist0 to Ydist2. In the following, the reproduced brightness data of pixels A to D are referred to as $Y_A'$ to $Y_D'$, respectively. More specifically, the value of the minimum brightness data Ymin is used as the brightness data of the pixel which is described as having the minimum value in the address data. Furthermore, the brightness data of the other pixels are reproduced by adding the minimum brightness data Ymin after performing 2-bit left bit shifts on Ydist0 to Ydist2. In this embodiment, the brightness data $Y_A'$ to $Y_D'$ are reproduced by the following formula:

$Y_A'=Y\text{dist0}\times4+Y\text{min}=44+4=48,$ $Y_B'=Y\text{dist1}\times4+Y\text{min}=24+4=28,$ $Y_C'=Y\text{dist2}\times4+Y\text{min}=12+4=16,\text{ and}$ $Y_D'=Y\text{min}=4.$ Furthermore, the grayscale values of the R, G and B subpixels of pixels A to D are reproduced from the brightness data $Y_A'$ to $Y_D'$ and the color difference data Cr' and Cb' by the following matrix operation:

$$\begin{bmatrix} R_k \\ G_k \\ B_k \end{bmatrix} = \begin{bmatrix} 1 & -1 & 3 \\ 1 & -1 & -1 \\ 1 & 3 & -1 \end{bmatrix} \begin{bmatrix} Y_k' \\ Cr' \\ Cb' \end{bmatrix} >> 2,$$

where ">>2" is an operator indicating 2-bit truncation. As can be understood from the above formula, the color difference data Cr' and Cb' are used in common in the reproduction of the grayscale values of the R, G and B subpixels of pixels A to D.

The above-described procedure completes the reproduction of the grayscale values of the R subpixels, the G subpixels, and B subpixels of pixels A to D. It would be understood that the original image data of pixels A to D are approximately reproduced by the above-described decompression method by comparing the values of the (4×1) decompressed data of pixels A to D illustrated in the right column of FIG. 16B with the original image data of pixels A to D illustrated in the left column of FIG. 16A.

4-5. Calculation of Error Data α

In the following, a description is given of the calculation of the error data α used in the (1×4) pixel compression, the (2+1×2) pixel compression, and the (2×2) pixel compression.

Figures 17, 18:
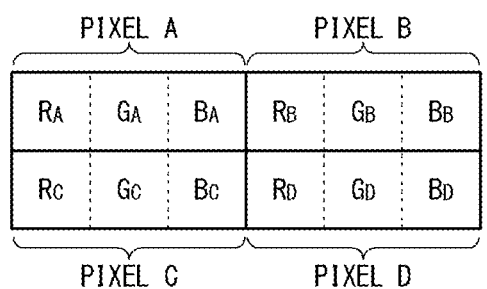
FIG. 17 is a diagram illustrating an example of a basic matrix used for the generation of error data α.
FIG. 18 is a conceptual illustration illustrating another example of a block, which is unit data of compression processing.

The error data α used for the bit plane reduction processing performed on each pixel, which is performed in the (1×4) pixel compression and the (2+1×2) pixel compression, are calculated from the basic matrix illustrated in FIG. 17 and the coordinates of the respective pixels. The basic matrix is a matrix which describes the relation of the lower two bits x1 and x0 of the x coordinate of the pixel and lower two bits y1 and y0 of the v coordinate with a basic value Q of the error data α; the basic value Q is a value used as a seed of the calculation of the data α.

In detail, the basic value Q is extracted from the matrix elements of the basic matrix based on the lower two bits x1 and x0 of the x coordinate of the pixel of interest and the lower two bits y1 and y0 of the y coordinate. For example, when the bit-plane reduction processing is performed on pixel A and the lower two bits of the x and y coordinates of the pixel A are "00", "15" is extracted as the basic value Q.

Furthermore, the following calculation is performed on the basic value Q in accordance with the number of bits of the bit truncation processing which follows the bit-plane reduction processing, to thereby calculate the error data α:

$\alpha = Q \times 2$, (for the case when the number of bits of the bit truncation processing is five)

$\alpha = Q$, (for the case when the number of bits of the bit truncation processing is four) and $\alpha = Q/2$, (for the case when the number of bits of the bit round-off processing is three).

On the other hand, the error data α used for the calculation of the representative values of the image data of the two pixels having a high correlation in the (2+1×2) pixel compression and the (2×2) pixel compression are calculated from the basic matrix shown in FIG. 17, and the second lowest bits x1 and y1 of the x and y coordinates of the two pixels of interest. In detail, one of the pixels of the target block is first selected as the pixel used for the extraction of the basic value Q in accordance with the combination of the two pixels of interest in the target block. The pixel used for the extraction of the basic value Q is referred to as Q extraction pixel, hereinafter. The relation of the combination of the two pixels of interest with the Q extraction pixel is as follows:

The Q extraction pixel is pixel A when the two pixels of interest are pixels A and B.

The Q extraction pixel is pixel A when the two pixels of interest are pixels A and C.

The Q extraction pixel is pixel A when the two pixels of interest are pixels A and D.

The Q extraction pixel is pixel B when the two pixels of interest are pixels B and C The Q extraction pixel is pixel B when the two pixels of interest are pixels B and D.

The Q extraction pixel is pixel B when the two pixels of interest are pixels C and D.

Furthermore, the basic value Q associated with the Q extraction pixel is extracted from the basic matrix in accordance with the second lowest bits x1 and y1 of the x and y coordinates of the two pixels of interest. For example, when the two pixels of interest are pixels A and B, the Q extraction pixel is pixel A. In this case, out of the four basic values Q associated with pixel A in the basic matrix, the basic value Q finally used is selected as follows in accordance with x1 and y1:

$Q=15$, (for $x1=y1=$"0")

$Q=01$, (for $x1=$"1", $y1=$"0")

$Q=07$, (for $x1=$"0", $y1=$"1") and $Q=13(x1=y1=$"1").

Furthermore, the following calculation is performed on the basic value Q in accordance with the number of bits of the bit truncation processing which follows the calculation of the representative values to thereby calculate the error data α used for the calculation processing of the representative values of the image data of the two pixels having a high correlation:

$\alpha = Q/2$, (for a case when the number of bits of the bit truncation processing is three)

$\alpha = Q/4$, (for a case when the number of bits of the bit round-off processing is two) and $\alpha = Q/8$ (for a case when the number of bits of the bit round-off processing is one).

For example, when the two pixels of interest are pixels A and B, $x1=y1=$"1", and the number of bits of the bit truncation processing is three, the error data α are determined as follows:

$Q=13$, and $\alpha = 13/2 = 6$.

It should be noted that the calculation method of the error data α is not limited to the above-described method. For example, another matrix which is a Bayer matrix may be used as the basic matrix instead.

Although various embodiments of the present invention have been described above, the present invention shall not be interpreted as being limited to the above-described embodiments. For example, although liquid crystal display devices provided with a liquid crystal display panel are presented in the above-described embodiments, it would be apparent to the person skilled in the art that the present invention is applicable also to display apparatuses including other display devices.

Furthermore, although the target block is defined as pixels arranged in one row and four columns in the above-described embodiments, the target block may be defined as four pixels with an arbitrary arrangement. As illustrated in FIG. 18, for example, the target block may be defined as pixels arranged in two rows and two columns. Also in this case, the above-described processing is also applicable by defining pixels A, B, C and D as shown in FIG. 18.

DESCRIPTION OF NUMERALS

1: liquid crystal display apparatus
2: liquid crystal display panel
3: timing control circuit
4: driver
5: gate line drive circuit
6: serial signal line
7: clock signal line
11: compression circuit
12: serial transmission circuit
13: PLL circuit 14, 14A: serial receiving circuit
15: decompression circuit
16: display latch section
17: data line driver circuit
18: PLL circuit
21: phase comparator
22: VCO
23, 123: frequency divider
123a: frequency dividing ratio adjustment circuit
31: form recognition section
32: (1×4) pixel compression section
33: (2+1×2) pixel compression section
34: (2×2) pixel compression section
35: (4×1) pixel compression section
36: compressed data selection section
41: form recognition section
42: (1×4) pixel decompression section
43: (2+1×2) pixel decompression section
44: (2×2) pixel decompression section
45: (4×1) pixel decompression section
50: image processing apparatus
51: processor
52: memory
53: external input interface
53a: compression circuit
54: bus

The invention claimed is:

1. A display apparatus, comprising:
a display device;
a display device driver which drives said display device;
a compression section configured to select, in response to a frame rate with which said display device driver drives said display device, a data compression ratio such that a product of said data compression ratio and said frame rate is kept constant independently of said frame rate, and generate compression data by compression processing on image data with the data compression ratio; and
a transmission section which, when receiving said compressed data from said compression section, transmits said compressed data to said display device driver by using a serial data signal,
wherein said display device driver receives said serial data signal from said transmission section, generates decompressed data by decompressing said compressed data transmitted by using said serial data signal, and drives said display device in response to said decompressed data, and
wherein said compression section is configured to receive the frame rate and adjust the data compression ratio based on the received frame rate,
wherein said transmission section includes:
a first clock generating circuit formed as a Phase Locked Loop (PLL) or a Delay Locked Loop (DLL), which venerates a first synchronizing clock signal synchronous with a source clock signal; and
a serial transmission circuit transmitting said serial data signal in synchronization with the first synchronizing clock signal received from said first clock generating circuit,
wherein said first clock generating circuit is configured not to switch a frequency of said first synchronizing clock signal even when switching of said frame rate occurs.

2. The display apparatus according to claim 1, wherein, in a case that said data compression ratio is defined as a ratio of a number of bits of said compressed data to a number of bits of said image data, said data compression ratio is set so that the product of said data compression ratio and said frame rate is kept constant independently of said frame rate.

3. The display apparatus according to claim 1, wherein said compression section is adapted to an operation of outputting said image data as uncompressed data without compressing said image data,
wherein, when receiving said uncompressed data from said compression section, said transmission section transmits said uncompressed data to said display device driver by using said serial data signal,
wherein a transmission rate in transmitting said uncompressed data from said transmission section to said display device drive by using said serial data signal is equal to a transmission rate in transmitting said compressed data from said transmission section to said display device drive by using said serial data signal.

4. The display apparatus according to claim 1 wherein said display device driver includes a reception section receiving said serial data,
wherein said reception section includes:
a second clock generating circuit formed as a Phase Locked Loop (PLL) or a Delay Locked Loop (DLL), which generates a second synchronizing clock signal synchronous with said serial data signal; and
a serial reception circuit which performs sampling on said serial data signal in synchronization with the second synchronizing clock signal received from said second clock generating circuit.

5. The display apparatus according to claim 1, wherein said first clock generating circuit includes:
a frequency divider which receives said first synchronizing clock signal and outputs a frequency-divided clock signal having a frequency equal to or lower than that of said first synchronizing clock signal;
a phase comparator circuit generating an output signal responsive to a phase difference between said source clock signal and said frequency-divided clock signal; and
a clock output circuit outputting said first synchronizing clock signal in response to said output signal received from said phase comparator, while controlling a frequency of said first synchronizing clock signal, and
wherein said frequency divider is configured so that a ratio of a frequency of said frequency-divided clock signal to the frequency of said first synchronizing clock signal is fixed.

6. The display apparatus according to claim 1, wherein the frame rate is switched in response to a change of contents displayed on the display device, and the said compression section adjusts the data compression ratio in response to detecting the switch in frame rate.

7. A display apparatus control circuit controlling a display device driver which drives a display device, said circuit comprising:
a compression section configured to select, in response to a frame rate with which said display device driver drives said display device, a data compression ratio such that a product of said data compression ratio and said frame rate is kept constant independently of said frame rate, and generate compression data by compression processing on image data with the data compression ratio; and
a transmission section which, when receiving said compressed data from said compression section, transmits said compressed data to said display device driver by using a serial data signal, wherein said display device driver receives said serial data signal from said transmission section, generates decompressed data by decompressing said compressed data transmitted by using said serial data signal, and drives said display device in response to said decompressed data, and wherein said compression section is configured to receive the frame rate and adjust the data compression ratio based on the received frame rate, wherein said transmission section includes:

a first clock generating circuit formed as a Phase Locked Loop (PLL) or a Delay Locked Loop (DLL), which generates a first synchronizing clock signal synchronous with a source clock signal; and a serial transmission circuit transmitting said serial data signal in synchronization with the first synchronizing clock signal received from said first clock generating circuit, wherein said first clock generating circuit is configured not to switch a frequency of said first synchronizing clock signal even when switching of said frame rate occurs.

8. The display apparatus control circuit according to claim 7, wherein, in a case that said data compression ratio is defined as a ratio of a number of bits of said compressed data to a number of bits of said image data, said data compression ratio is set so that the product of said data compression ratio and said frame rate is kept constant independently of said frame rate.

9. A display apparatus control circuit controlling a display device driver which drives a display device, the control circuit comprising:

at least one processor configured to:

receive image data for data compression and a frame rate with which the display device driver drives the display device;

select, in response to a frame rate with which said display device driver drives said display device, a data compression ratio such that a product of said data compression ratio and said frame rate is kept constant independently of said frame rate;

generate compression data by compression processing on image data with the data compression ratio; and transmit the compressed data to the display device driver by using a serial data signal, wherein said at least one processor is configured to receive the frame rate and adjust the data compression ratio based on the received frame rate, wherein said transmitting the compressed data comprises:

generating a first synchronizing clock signal synchronous with a source clock signal by a clock generating circuit formed as a Phase Locked Loop (PLL) or a Delay Locked Loop (DLL); and transmitting said serial data signal in synchronization with the first synchronizing clock signal received from said first clock generating circuit, wherein said first clock generating circuit is configured not to switch a frequency of said first synchronizing clock signal even when switching of said frame rate occurs.

* * * * *

UNITED STATES PATENT AND TRADEMARK OFFICE
CERTIFICATE OF CORRECTION

PATENT NO. : 9,691,339 B2
APPLICATION NO. : 14/007228
DATED : June 27, 2017
INVENTOR(S) : Hirobumi Furihata and Takashi Nose It is certified that error appears in the above-identified patent and that said Letters Patent is hereby corrected as shown below:

In the Specification

Column 6, Line 58:
"data" has been replaced with --data,--

Column 8, Line 37:
"21a" has been replaced with --21 a--

Column 15, Line 25-27:
"$|R_D-R_C|\leq Th2$,
$|G_D-G_D|\leq Th2$, and" has been replaced with --$|R_B-R_C|\leq Th2$,
$|G_B-G_C|\leq Th2$, and--

Column 15, Line 46:
"$\max(R_A,R_B,R_C,R_D)-\min(R_A,R_B,R_B,R_D)<Th3$," has been replaced with
--$\max(R_A,R_B,R_C,R_D)-\min(R_A,R_B,R_C,R_D)<Th3$,--

Column 19, Line 58-61:
"$Rave=(R_A+R_3+1)/2$,
$Gave=(G_A+G_3/1)/2$, and" has been replaced with --$Rave=(R_A+R_B+1)/2$,
$Gave=(G_A+G_B+1)/2$, and--

Column 23, Line 25:
After "β,", insert --the--

Column 25, Line 25:
After "β,", insert --and--

Column 25, Line 49:
"$Rave1=(R_A+R_B1)/2$," has been replaced with --$Rave1=(R_A+R_B+1)/2$,--

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,691,339 B2

Column 26, Line 30:
"value β," has been replaced with --value,--

Column 27, Line 8:
After "β,", insert --this--

Column 27, Line 13:
After "value", insert --difference--

Column 27, Line 44:
"C" has been replaced with --G--

Column 29, Line 66:
After "the", insert --β--

Column 33, Line 57:
"C" has been replaced with --C.--

In the Claims

Claim 1, Column 35, Line 55:
"venerates" has been replaced with --generates--